(12) United States Patent
Parthasarathy et al.

(10) Patent No.: US 9,298,261 B2
(45) Date of Patent: Mar. 29, 2016

(54) METHOD FOR ACTUATING A TACTILE INTERFACE LAYER

(71) Applicant: Tactus Technology, Inc., Fremont, CA (US)

(72) Inventors: Radhakrishnan Parthasarathy, Fremont, CA (US); Micah Yairi, Fremont, CA (US)

(73) Assignee: Tactus Technology, Inc., Fremont, CA (US)

( * ) Notice: Subject to any disclaimer, the term of this patent is extended or adjusted under 35 U.S.C. 154(b) by 15 days.

(21) Appl. No.: 14/471,889

(22) Filed: Aug. 28, 2014

(65) Prior Publication Data

US 2015/0077364 A1    Mar. 19, 2015

Related U.S. Application Data

(60) Provisional application No. 61/871,264, filed on Aug. 28, 2013.

(51) Int. Cl.
*G06F 3/01*     (2006.01)
*G06F 3/041*    (2006.01)
(Continued)

(52) U.S. Cl.
CPC .............. *G06F 3/016* (2013.01); *G06F 3/005* (2013.01); *G06F 3/041* (2013.01); *G06F 3/04883* (2013.01); *G06F 3/04886* (2013.01);
(Continued)

(58) Field of Classification Search
CPC combination set(s) only.
See application file for complete search history.

(56) References Cited

U.S. PATENT DOCUMENTS 3,034,628 A    5/1962    Wadey
3,659,354 A    5/1972    Sutherland
(Continued)

FOREIGN PATENT DOCUMENTS

CN    1260525 A    7/2000
CN    1530818 A    9/2004
(Continued)

OTHER PUBLICATIONS

"Sharp Develops and Will Mass Produce New System LCD with Embedded Optical Sensors to Provide Input Capabilities Including Touch Screen and Scanner Functions," Sharp Press Release, Aug. 31, 2007, 3 pages, downloaded from the Internet at: http://sharp-world.com/corporate/news/070831.html.
(Continued)

*Primary Examiner* — Abbas Abdulselam
(74) *Attorney, Agent, or Firm* — Jeffrey Schox

(57) ABSTRACT

One variation of the method includes registering interaction with a dynamic tactile interface including a tactile layer and a substrate, the tactile layer defining a tactile surface, a deformable region, and a peripheral region adjacent the deformable region and coupled to the substrate opposite the tactile surface, the method including: detecting an orientation of the device; predicting a location of an upcoming input related to a native application executing on the device; selecting a particular deformable region from a set of deformable regions, the particular deformable region substantially coincident the input location; selectively transitioning the particular deformable region from a retracted setting into an expanded setting, the deformable region substantially flush with the peripheral region in the retracted setting and tactilely distinguishable from the peripheral region in the expanded setting; and detecting an input, corresponding to the upcoming input, on the particular deformable region.

23 Claims, 13 Drawing Sheets

(51) Int. Cl.
*G06F 3/00* (2006.01)
*G06F 3/0488* (2013.01)

(52) U.S. Cl.
CPC ............... *G06F2203/04105* (2013.01); *G06F 2203/04809* (2013.01)

(56) References Cited

U.S. PATENT DOCUMENTS

| | | | |
|---|---|---|---|
| 3,759,108 A | 9/1973 | Borom et al. | |
| 3,780,236 A | 12/1973 | Gross | |
| 3,818,487 A | 6/1974 | Brody et al. | |
| 4,109,118 A | 8/1978 | Kley | |
| 4,209,819 A | 6/1980 | Seignemartin | |
| 4,290,343 A | 9/1981 | Gram | |
| 4,307,268 A | 12/1981 | Harper | |
| 4,467,321 A | 8/1984 | Volnak | |
| 4,477,700 A | 10/1984 | Balash et al. | |
| 4,517,421 A | 5/1985 | Margolin | |
| 4,543,000 A | 9/1985 | Hasenbalg | |
| 4,584,625 A | 4/1986 | Kellogg | |
| 4,700,025 A | 10/1987 | Hatayama et al. | |
| 4,772,205 A | 9/1988 | Chlumsky et al. | |
| 4,920,343 A | 4/1990 | Schwartz | |
| 4,940,734 A | 7/1990 | Ley et al. | |
| 5,194,852 A | 3/1993 | More et al. | |
| 5,195,659 A | 3/1993 | Eiskant | |
| 5,212,473 A | 5/1993 | Louis | |
| 5,222,895 A | 6/1993 | Fricke | |
| 5,286,199 A | 2/1994 | Kipke | |
| 5,369,228 A | 11/1994 | Faust | |
| 5,412,189 A | 5/1995 | Cragun | |
| 5,459,461 A | 10/1995 | Crowley et al. | |
| 5,488,204 A | 1/1996 | Mead et al. | |
| 5,496,174 A | 3/1996 | Garner | |
| 5,666,112 A | 9/1997 | Crowley et al. | |
| 5,717,423 A | 2/1998 | Parker | |
| 5,729,222 A | 3/1998 | Iggulden et al. | |
| 5,742,241 A | 4/1998 | Crowley et al. | |
| 5,754,023 A | 5/1998 | Roston et al. | |
| 5,766,013 A | 6/1998 | Vuyk | |
| 5,767,839 A | 6/1998 | Rosenberg | |
| 5,835,080 A | 11/1998 | Beeteson et al. | |
| 5,880,411 A | 3/1999 | Gillespie et al. | |
| 5,889,236 A | 3/1999 | Gillespie et al. | |
| 5,917,906 A | 6/1999 | Thornton | |
| 5,943,043 A | 8/1999 | Furuhata et al. | |
| 5,977,867 A | 11/1999 | Blouin | |
| 5,982,304 A | 11/1999 | Selker et al. | |
| 6,067,116 A | 5/2000 | Yamano et al. | |
| 6,154,198 A | 11/2000 | Rosenberg | |
| 6,154,201 A | 11/2000 | Levin et al. | |
| 6,160,540 A | 12/2000 | Fishkin et al. | |
| 6,169,540 B1 | 1/2001 | Rosenberg et al. | |
| 6,187,398 B1 | 2/2001 | Eldridge | |
| 6,188,391 B1 | 2/2001 | Seely et al. | |
| 6,218,966 B1 | 4/2001 | Goodwin et al. | |
| 6,243,074 B1 | 6/2001 | Fishkin et al. | |
| 6,243,078 B1 | 6/2001 | Rosenberg | |
| 6,268,857 B1 | 7/2001 | Fishkin et al. | |
| 6,271,828 B1 | 8/2001 | Rosenberg et al. | |
| 6,278,441 B1 | 8/2001 | Gouzman et al. | |
| 6,300,937 B1 | 10/2001 | Rosenberg | |
| 6,310,614 B1 | 10/2001 | Maeda et al. | |
| 6,323,846 B1 | 11/2001 | Westerman et al. | |
| 6,337,678 B1 | 1/2002 | Fish | |
| 6,354,839 B1 | 3/2002 | Schmidt et al. | |
| 6,356,259 B1 | 3/2002 | Maeda et al. | |
| 6,359,572 B1 | 3/2002 | Vale | |
| 6,366,272 B1 | 4/2002 | Rosenberg et al. | |
| 6,369,803 B2 | 4/2002 | Brisebois et al. | |
| 6,384,743 B1 | 5/2002 | Vanderheiden | |
| 6,414,671 B1 | 7/2002 | Gillespie et al. | |
| 6,429,846 B2 | 8/2002 | Rosenberg et al. | |
| 6,437,771 B1 | 8/2002 | Rosenberg et al. | |
| 6,462,294 B2 | 10/2002 | Davidson et al. | |
| 6,469,692 B2 | 10/2002 | Rosenberg | |
| 6,486,872 B2 | 11/2002 | Rosenberg et al. | |
| 6,498,353 B2 | 12/2002 | Nagle et al. | |
| 6,501,462 B1 | 12/2002 | Garner | |
| 6,509,892 B1 | 1/2003 | Cooper et al. | |
| 6,529,183 B1 | 3/2003 | Maclean et al. | |
| 6,573,844 B1 | 6/2003 | Venolia et al. | |
| 6,636,202 B2 | 10/2003 | Ishmael et al. | |
| 6,639,581 B1 | 10/2003 | Moore et al. | |
| 6,655,788 B1 | 12/2003 | Freeman | |
| 6,657,614 B1 | 12/2003 | Ito et al. | |
| 6,667,738 B2 | 12/2003 | Murphy | |
| 6,681,031 B2 | 1/2004 | Cohen et al. | |
| 6,683,627 B1 | 1/2004 | Ullmann et al. | |
| 6,686,911 B1 | 2/2004 | Levin et al. | |
| 6,697,086 B2 | 2/2004 | Rosenberg et al. | |
| 6,700,556 B2 | 3/2004 | Richley et al. | |
| 6,703,924 B2 | 3/2004 | Tecu et al. | |
| 6,743,021 B2 | 6/2004 | Prince et al. | |
| 6,788,295 B1 | 9/2004 | Inkster | |
| 6,819,316 B2 | 11/2004 | Schulz et al. | |
| 6,850,222 B1 | 2/2005 | Rosenberg | |
| 6,861,961 B2 | 3/2005 | Sandbach et al. | |
| 6,877,986 B2 | 4/2005 | Fournier et al. | |
| 6,881,063 B2 | 4/2005 | Yang | |
| 6,930,234 B2 | 8/2005 | Davis | |
| 6,937,225 B1 | 8/2005 | Kehlstadt et al. | |
| 6,975,305 B2 | 12/2005 | Yamashita | |
| 6,979,164 B2 | 12/2005 | Kramer | |
| 6,982,696 B1 | 1/2006 | Shahoian | |
| 6,995,745 B2 | 2/2006 | Boon et al. | |
| 7,027,032 B2 | 4/2006 | Rosenberg et al. | |
| 7,056,051 B2 | 6/2006 | Fiffie | |
| 7,061,467 B2 | 6/2006 | Rosenberg | |
| 7,064,655 B2 | 6/2006 | Murray et al. | |
| 7,079,111 B2 | 7/2006 | Ho | |
| 7,081,888 B2 | 7/2006 | Cok et al. | |
| 7,096,852 B2 | 8/2006 | Gregorio | |
| 7,102,541 B2 | 9/2006 | Rosenberg | |
| 7,104,152 B2 | 9/2006 | Levin et al. | |
| 7,106,305 B2 | 9/2006 | Rosenberg | |
| 7,106,313 B2 | 9/2006 | Schena et al. | |
| 7,109,967 B2 | 9/2006 | Hioki et al. | |
| 7,112,737 B2 | 9/2006 | Ramstein | |
| 7,113,166 B1 | 9/2006 | Rosenberg et al. | |
| 7,116,317 B2 | 10/2006 | Gregorio et al. | |
| 7,124,425 B1 | 10/2006 | Anderson, Jr. et al. | |
| 7,129,854 B2 | 10/2006 | Arneson et al. | |
| 7,131,073 B2 | 10/2006 | Rosenberg et al. | |
| 7,136,045 B2 | 11/2006 | Rosenberg et al. | |
| 7,138,977 B2 | 11/2006 | Kinerk et al. | |
| 7,138,985 B2 | 11/2006 | Nakajima | |
| 7,143,785 B2 | 12/2006 | Maerkl et al. | |
| 7,144,616 B1 | 12/2006 | Unger et al. | |
| 7,148,875 B2 | 12/2006 | Rosenberg et al. | |
| 7,151,432 B2 | 12/2006 | Tierling | |
| 7,151,527 B2 | 12/2006 | Culver | |
| 7,151,528 B2 | 12/2006 | Taylor et al. | |
| 7,154,470 B2 | 12/2006 | Tierling | |
| 7,158,112 B2 | 1/2007 | Rosenberg et al. | |
| 7,159,008 B1 | 1/2007 | Wies et al. | |
| 7,161,276 B2 | 1/2007 | Face | |
| 7,161,580 B2 | 1/2007 | Bailey et al. | |
| 7,168,042 B2 | 1/2007 | Braun et al. | |
| 7,176,903 B2 | 2/2007 | Katsuki et al. | |
| 7,182,691 B1 | 2/2007 | Schena | |
| 7,191,191 B2 | 3/2007 | Peurach et al. | |
| 7,193,607 B2 | 3/2007 | Moore et al. | |
| 7,195,170 B2 | 3/2007 | Matsumoto et al. | |
| 7,196,688 B2 | 3/2007 | Schena | |
| 7,198,137 B2 | 4/2007 | Olien | |
| 7,199,790 B2 | 4/2007 | Rosenberg et al. | |
| 7,202,851 B2 | 4/2007 | Cunningham et al. | |
| 7,205,981 B2 | 4/2007 | Cunningham | |
| 7,208,671 B2 | 4/2007 | Chu | |
| 7,209,028 B2 | 4/2007 | Boronkay et al. | |
| 7,209,113 B2 | 4/2007 | Park | |
| 7,209,117 B2 | 4/2007 | Rosenberg et al. | |

(56) References Cited

U.S. PATENT DOCUMENTS

| | | |
|---|---|---|
| 7,209,118 B2 | 4/2007 | Shahoian et al. |
| 7,210,160 B2 | 4/2007 | Anderson, Jr. et al. |
| 7,215,326 B2 | 5/2007 | Rosenberg |
| 7,216,671 B2 | 5/2007 | Unger et al. |
| 7,218,310 B2 | 5/2007 | Tierling et al. |
| 7,218,313 B2 | 5/2007 | Marcus et al. |
| 7,233,313 B2 | 6/2007 | Levin et al. |
| 7,233,315 B2 | 6/2007 | Gregorio et al. |
| 7,233,476 B2 | 6/2007 | Goldenberg et al. |
| 7,236,157 B2 | 6/2007 | Schena et al. |
| 7,245,202 B2 | 7/2007 | Levin |
| 7,245,292 B1 | 7/2007 | Custy |
| 7,249,951 B2 | 7/2007 | Bevirt et al. |
| 7,250,128 B2 | 7/2007 | Unger et al. |
| 7,253,803 B2 | 8/2007 | Schena et al. |
| 7,253,807 B2 | 8/2007 | Nakajima |
| 7,265,750 B2 | 9/2007 | Rosenberg |
| 7,280,095 B2 | 10/2007 | Grant |
| 7,283,120 B2 | 10/2007 | Grant |
| 7,283,123 B2 | 10/2007 | Braun et al. |
| 7,283,696 B2 | 10/2007 | Ticknor et al. |
| 7,289,106 B2 | 10/2007 | Bailey et al. |
| 7,289,111 B2 | 10/2007 | Asbill |
| 7,307,619 B2 | 12/2007 | Cunningham et al. |
| 7,308,831 B2 | 12/2007 | Cunningham et al. |
| 7,319,374 B2 | 1/2008 | Shahoian |
| 7,336,260 B2 | 2/2008 | Martin et al. |
| 7,336,266 B2 | 2/2008 | Hayward et al. |
| 7,339,572 B2 | 3/2008 | Schena |
| 7,339,580 B2 | 3/2008 | Westerman et al. |
| 7,342,573 B2 | 3/2008 | Ryynaenen |
| 7,355,595 B2 | 4/2008 | Bathiche et al. |
| 7,369,115 B2 | 5/2008 | Cruz-Hernandez et al. |
| 7,382,357 B2 | 6/2008 | Panotopoulos et al. |
| 7,390,157 B2 | 6/2008 | Kramer |
| 7,391,861 B2 | 6/2008 | Levy |
| 7,397,466 B2 | 7/2008 | Bourdelais et al. |
| 7,403,191 B2 | 7/2008 | Sinclair |
| 7,432,910 B2 | 10/2008 | Shahoian |
| 7,432,911 B2 | 10/2008 | Skarine |
| 7,432,912 B2 | 10/2008 | Cote et al. |
| 7,433,719 B2 | 10/2008 | Dabov |
| 7,471,280 B2 | 12/2008 | Prins |
| 7,489,309 B2 | 2/2009 | Levin et al. |
| 7,511,702 B2 | 3/2009 | Hotelling |
| 7,522,152 B2 | 4/2009 | Olien et al. |
| 7,545,289 B2 | 6/2009 | Mackey et al. |
| 7,548,232 B2 | 6/2009 | Shahoian et al. |
| 7,551,161 B2 | 6/2009 | Mann |
| 7,561,142 B2 | 7/2009 | Shahoian et al. |
| 7,567,232 B2 | 7/2009 | Rosenberg |
| 7,567,243 B2 | 7/2009 | Hayward |
| 7,589,714 B2 | 9/2009 | Funaki |
| 7,592,999 B2 | 9/2009 | Rosenberg et al. |
| 7,605,800 B2 | 10/2009 | Rosenberg |
| 7,609,178 B2 | 10/2009 | Son et al. |
| 7,656,393 B2 | 2/2010 | King et al. |
| 7,659,885 B2 | 2/2010 | Kraus et al. |
| 7,671,837 B2 | 3/2010 | Forsblad et al. |
| 7,679,611 B2 | 3/2010 | Schena |
| 7,679,839 B2 | 3/2010 | Polyakov et al. |
| 7,688,310 B2 | 3/2010 | Rosenberg |
| 7,701,438 B2 | 4/2010 | Chang et al. |
| 7,728,820 B2 | 6/2010 | Rosenberg et al. |
| 7,733,575 B2 | 6/2010 | Heim et al. |
| 7,743,348 B2 | 6/2010 | Robbins et al. |
| 7,755,602 B2 | 7/2010 | Tremblay et al. |
| 7,808,488 B2 | 10/2010 | Martin et al. |
| 7,834,853 B2 | 11/2010 | Finney et al. |
| 7,843,424 B2 | 11/2010 | Rosenberg et al. |
| 7,864,164 B2 | 1/2011 | Cunningham et al. |
| 7,869,589 B2 | 1/2011 | Tuovinen |
| 7,890,257 B2 | 2/2011 | Fyke et al. |
| 7,890,863 B2 | 2/2011 | Grant et al. |
| 7,920,131 B2 | 4/2011 | Westerman |
| 7,924,145 B2 | 4/2011 | Yuk et al. |
| 7,944,435 B2 | 5/2011 | Rosenberg et al. |
| 7,952,498 B2 | 5/2011 | Higa |
| 7,956,770 B2 | 6/2011 | Klinghult et al. |
| 7,973,773 B2 | 7/2011 | Pryor |
| 7,978,181 B2 | 7/2011 | Westerman |
| 7,978,183 B2 | 7/2011 | Rosenberg et al. |
| 7,978,186 B2 | 7/2011 | Vassallo et al. |
| 7,979,797 B2 | 7/2011 | Schena |
| 7,982,720 B2 | 7/2011 | Rosenberg et al. |
| 7,986,303 B2 | 7/2011 | Braun et al. |
| 7,986,306 B2 | 7/2011 | Eich et al. |
| 7,989,181 B2 | 8/2011 | Blattner et al. |
| 7,999,660 B2 | 8/2011 | Cybart et al. |
| 8,002,089 B2 | 8/2011 | Jasso et al. |
| 8,004,492 B2 | 8/2011 | Kramer et al. |
| 8,013,843 B2 | 9/2011 | Pryor |
| 8,020,095 B2 | 9/2011 | Braun et al. |
| 8,022,933 B2 | 9/2011 | Hardacker et al. |
| 8,031,181 B2 | 10/2011 | Rosenberg et al. |
| 8,044,826 B2 | 10/2011 | Yoo |
| 8,047,849 B2 | 11/2011 | Ahn et al. |
| 8,049,734 B2 | 11/2011 | Rosenberg et al. |
| 8,059,104 B2 | 11/2011 | Shahoian et al. |
| 8,059,105 B2 | 11/2011 | Rosenberg et al. |
| 8,063,892 B2 | 11/2011 | Shahoian et al. |
| 8,063,893 B2 | 11/2011 | Rosenberg et al. |
| 8,068,605 B2 | 11/2011 | Holmberg |
| 8,077,154 B2 | 12/2011 | Emig et al. |
| 8,077,440 B2 | 12/2011 | Krabbenborg et al. |
| 8,077,941 B2 | 12/2011 | Assmann |
| 8,094,121 B2 | 1/2012 | Obermeyer et al. |
| 8,094,806 B2 | 1/2012 | Levy |
| 8,103,472 B2 | 1/2012 | Braun et al. |
| 8,106,787 B2 | 1/2012 | Nurmi |
| 8,115,745 B2 | 2/2012 | Gray |
| 8,123,660 B2 | 2/2012 | Kruse et al. |
| 8,125,347 B2 | 2/2012 | Fahn |
| 8,125,461 B2 | 2/2012 | Weber et al. |
| 8,130,202 B2 | 3/2012 | Levine et al. |
| 8,144,129 B2 | 3/2012 | Hotelling et al. |
| 8,144,271 B2 | 3/2012 | Han |
| 8,154,512 B2 | 4/2012 | Olien et al. |
| 8,154,527 B2 | 4/2012 | Ciesla et al. |
| 8,159,461 B2 | 4/2012 | Martin et al. |
| 8,162,009 B2 | 4/2012 | Chaffee |
| 8,164,573 B2 | 4/2012 | Dacosta et al. |
| 8,166,649 B2 | 5/2012 | Moore |
| 8,169,306 B2 | 5/2012 | Schmidt et al. |
| 8,169,402 B2 | 5/2012 | Shahoian et al. |
| 8,174,372 B2 | 5/2012 | Da Costa |
| 8,174,495 B2 | 5/2012 | Takashima et al. |
| 8,174,508 B2 | 5/2012 | Sinclair et al. |
| 8,174,511 B2 | 5/2012 | Takenaka et al. |
| 8,178,808 B2 | 5/2012 | Strittmatter |
| 8,179,375 B2 | 5/2012 | Ciesla et al. |
| 8,179,377 B2 | 5/2012 | Ciesla et al. |
| 8,188,989 B2 | 5/2012 | Levin et al. |
| 8,195,243 B2 | 6/2012 | Kim et al. |
| 8,199,107 B2 | 6/2012 | Xu et al. |
| 8,199,124 B2 | 6/2012 | Ciesla et al. |
| 8,203,094 B2 | 6/2012 | Mittleman et al. |
| 8,203,537 B2 | 6/2012 | Tanabe et al. |
| 8,207,950 B2 | 6/2012 | Ciesla et al. |
| 8,212,772 B2 | 7/2012 | Shahoian |
| 8,217,903 B2 | 7/2012 | Ma et al. |
| 8,217,904 B2 | 7/2012 | Kim |
| 8,223,278 B2 | 7/2012 | Kim et al. |
| 8,224,392 B2 | 7/2012 | Kim et al. |
| 8,228,305 B2 | 7/2012 | Pryor |
| 8,232,976 B2 | 7/2012 | Yun et al. |
| 8,243,038 B2 | 8/2012 | Ciesla et al. |
| 8,253,052 B2 | 8/2012 | Chen |
| 8,253,703 B2 | 8/2012 | Eldering |
| 8,279,172 B2 | 10/2012 | Braun et al. |
| 8,279,193 B1 | 10/2012 | Birnbaum et al. |
| 8,310,458 B2 | 11/2012 | Faubert et al. |
| 8,345,013 B2 | 1/2013 | Heubel et al. |
| 8,350,820 B2 | 1/2013 | Deslippe et al. |

(56) References Cited

U.S. PATENT DOCUMENTS

| | | |
|---|---|---|
| 8,362,882 B2 | 1/2013 | Heubel et al. |
| 8,363,008 B2 | 1/2013 | Ryu et al. |
| 8,367,957 B2 | 2/2013 | Strittmatter |
| 8,368,641 B2 | 2/2013 | Tremblay et al. |
| 8,378,797 B2 | 2/2013 | Pance et al. |
| 8,384,680 B2 | 2/2013 | Paleczny et al. |
| 8,390,594 B2 | 3/2013 | Modarres et al. |
| 8,395,587 B2 | 3/2013 | Cauwels et al. |
| 8,395,591 B2 | 3/2013 | Kruglick |
| 8,400,402 B2 | 3/2013 | Son |
| 8,400,410 B2 | 3/2013 | Taylor et al. |
| 8,547,339 B2 | 10/2013 | Ciesla |
| 8,587,541 B2 | 11/2013 | Ciesla et al. |
| 8,587,548 B2 | 11/2013 | Ciesla et al. |
| 8,749,489 B2 | 6/2014 | Ito et al. |
| 2001/0008396 A1 | 7/2001 | Komata |
| 2001/0043189 A1 | 11/2001 | Brisebois et al. |
| 2002/0063694 A1 | 5/2002 | Keely et al. |
| 2002/0104691 A1 | 8/2002 | Kent et al. |
| 2002/0106614 A1 | 8/2002 | Prince et al. |
| 2002/0110237 A1 | 8/2002 | Krishnan |
| 2002/0149570 A1 | 10/2002 | Knowles et al. |
| 2002/0180620 A1 | 12/2002 | Gettemy et al. |
| 2003/0087698 A1 | 5/2003 | Nishiumi et al. |
| 2003/0117371 A1 | 6/2003 | Roberts et al. |
| 2003/0179190 A1 | 9/2003 | Franzen |
| 2003/0206153 A1 | 11/2003 | Murphy |
| 2003/0223799 A1 | 12/2003 | Pihlaja |
| 2004/0001589 A1 | 1/2004 | Mueller et al. |
| 2004/0056876 A1 | 3/2004 | Nakajima |
| 2004/0056877 A1 | 3/2004 | Nakajima |
| 2004/0106360 A1 | 6/2004 | Farmer et al. |
| 2004/0114324 A1 | 6/2004 | Kusaka et al. |
| 2004/0164968 A1 | 8/2004 | Miyamoto |
| 2004/0178006 A1 | 9/2004 | Cok |
| 2005/0007339 A1 | 1/2005 | Sato |
| 2005/0007349 A1 | 1/2005 | Vakil et al. |
| 2005/0020325 A1 | 1/2005 | Enger et al. |
| 2005/0030292 A1 | 2/2005 | Diederiks |
| 2005/0057528 A1 | 3/2005 | Kleen |
| 2005/0073506 A1 | 4/2005 | Durso |
| 2005/0088417 A1 | 4/2005 | Mulligan |
| 2005/0110768 A1 | 5/2005 | Marriott et al. |
| 2005/0162408 A1 | 7/2005 | Martchovsky |
| 2005/0212773 A1 | 9/2005 | Asbill |
| 2005/0231489 A1 | 10/2005 | Ladouceur et al. |
| 2005/0253816 A1 | 11/2005 | Himberg et al. |
| 2005/0270444 A1 | 12/2005 | Miller et al. |
| 2005/0285846 A1 | 12/2005 | Funaki |
| 2006/0026521 A1 | 2/2006 | Hotelling et al. |
| 2006/0087479 A1 | 4/2006 | Sakurai et al. |
| 2006/0097991 A1 | 5/2006 | Hotelling et al. |
| 2006/0098148 A1 | 5/2006 | Kobayashi et al. |
| 2006/0118610 A1 | 6/2006 | Pihlaja et al. |
| 2006/0119586 A1 | 6/2006 | Grant et al. |
| 2006/0152474 A1 | 7/2006 | Saito et al. |
| 2006/0154216 A1 | 7/2006 | Hafez et al. |
| 2006/0197753 A1 | 9/2006 | Hotelling |
| 2006/0214923 A1 | 9/2006 | Chiu et al. |
| 2006/0238495 A1 | 10/2006 | Davis |
| 2006/0238510 A1 | 10/2006 | Panotopoulos et al. |
| 2006/0256075 A1 | 11/2006 | Anastas et al. |
| 2006/0278444 A1 | 12/2006 | Binstead |
| 2007/0013662 A1 | 1/2007 | Fauth |
| 2007/0036492 A1 | 2/2007 | Lee |
| 2007/0085837 A1 | 4/2007 | Ricks et al. |
| 2007/0108032 A1 | 5/2007 | Matsumoto et al. |
| 2007/0122314 A1 | 5/2007 | Strand et al. |
| 2007/0130212 A1 | 6/2007 | Peurach et al. |
| 2007/0152983 A1 | 7/2007 | Mckillop et al. |
| 2007/0165004 A1 | 7/2007 | Seelhammer et al. |
| 2007/0171210 A1 | 7/2007 | Chaudhri et al. |
| 2007/0182718 A1 | 8/2007 | Schoener et al. |
| 2007/0229233 A1 | 10/2007 | Dort |
| 2007/0229464 A1 | 10/2007 | Hotelling et al. |
| 2007/0236466 A1 | 10/2007 | Hotelling |
| 2007/0236469 A1 | 10/2007 | Woolley et al. |
| 2007/0247429 A1 | 10/2007 | Westerman |
| 2007/0257634 A1 | 11/2007 | Leschin et al. |
| 2007/0273561 A1 | 11/2007 | Philipp |
| 2007/0296702 A1 | 12/2007 | Strawn et al. |
| 2007/0296709 A1 | 12/2007 | Guanghai |
| 2008/0010593 A1 | 1/2008 | Uusitalo et al. |
| 2008/0024459 A1 | 1/2008 | Poupyrev et al. |
| 2008/0054875 A1 | 3/2008 | Saito |
| 2008/0062151 A1 | 3/2008 | Kent |
| 2008/0136791 A1 | 6/2008 | Nissar |
| 2008/0138774 A1 | 6/2008 | Ahn et al. |
| 2008/0143693 A1 | 6/2008 | Schena |
| 2008/0150911 A1 | 6/2008 | Harrison |
| 2008/0165139 A1 | 7/2008 | Hotelling et al. |
| 2008/0174570 A1 | 7/2008 | Jobs et al. |
| 2008/0202251 A1 | 8/2008 | Serban et al. |
| 2008/0238448 A1 | 10/2008 | Moore et al. |
| 2008/0248836 A1 | 10/2008 | Caine |
| 2008/0251368 A1 | 10/2008 | Holmberg et al. |
| 2008/0252607 A1 | 10/2008 | De Jong et al. |
| 2008/0266264 A1 | 10/2008 | Lipponen et al. |
| 2008/0286447 A1 | 11/2008 | Alden et al. |
| 2008/0291169 A1 | 11/2008 | Brenner et al. |
| 2008/0297475 A1 | 12/2008 | Woolf et al. |
| 2008/0303796 A1 | 12/2008 | Fyke |
| 2009/0002140 A1 | 1/2009 | Higa |
| 2009/0002205 A1 | 1/2009 | Klinghult et al. |
| 2009/0002328 A1 | 1/2009 | Ullrich et al. |
| 2009/0002337 A1 | 1/2009 | Chang |
| 2009/0009480 A1 | 1/2009 | Heringslack |
| 2009/0015547 A1 | 1/2009 | Franz et al. |
| 2009/0028824 A1 | 1/2009 | Chiang et al. |
| 2009/0033617 A1 | 2/2009 | Lindberg et al. |
| 2009/0059495 A1 | 3/2009 | Matsuoka |
| 2009/0066672 A1 | 3/2009 | Tanabe et al. |
| 2009/0085878 A1 | 4/2009 | Heubel et al. |
| 2009/0106655 A1 | 4/2009 | Grant et al. |
| 2009/0115733 A1 | 5/2009 | Ma et al. |
| 2009/0115734 A1 | 5/2009 | Fredriksson et al. |
| 2009/0128376 A1 | 5/2009 | Caine et al. |
| 2009/0128503 A1 | 5/2009 | Grant et al. |
| 2009/0129021 A1 | 5/2009 | Dunn |
| 2009/0132093 A1 | 5/2009 | Arneson et al. |
| 2009/0135145 A1 | 5/2009 | Chen et al. |
| 2009/0140989 A1 | 6/2009 | Ahlgren |
| 2009/0160813 A1 | 6/2009 | Takashima et al. |
| 2009/0167508 A1 | 7/2009 | Fadell et al. |
| 2009/0167509 A1 | 7/2009 | Fadell et al. |
| 2009/0167567 A1 | 7/2009 | Halperin et al. |
| 2009/0167677 A1 | 7/2009 | Kruse et al. |
| 2009/0167704 A1 | 7/2009 | Terlizzi et al. |
| 2009/0174673 A1 | 7/2009 | Ciesla |
| 2009/0174687 A1 | 7/2009 | Ciesla et al. |
| 2009/0181724 A1 | 7/2009 | Pettersson |
| 2009/0182501 A1 | 7/2009 | Fyke et al. |
| 2009/0195512 A1 | 8/2009 | Pettersson |
| 2009/0207148 A1 | 8/2009 | Sugimoto et al. |
| 2009/0215500 A1 | 8/2009 | You et al. |
| 2009/0231305 A1 | 9/2009 | Hotelling et al. |
| 2009/0243998 A1 | 10/2009 | Wang |
| 2009/0250267 A1 | 10/2009 | Heubel et al. |
| 2009/0289922 A1 | 11/2009 | Henry |
| 2009/0303022 A1 | 12/2009 | Griffin et al. |
| 2009/0309616 A1 | 12/2009 | Klinghult |
| 2010/0043189 A1 | 2/2010 | Fukano |
| 2010/0045613 A1 | 2/2010 | Wu et al. |
| 2010/0073241 A1 | 3/2010 | Ayala et al. |
| 2010/0078231 A1 | 4/2010 | Yeh et al. |
| 2010/0079404 A1 | 4/2010 | Degner et al. |
| 2010/0097323 A1 | 4/2010 | Edwards et al. |
| 2010/0103116 A1 | 4/2010 | Leung et al. |
| 2010/0103137 A1 | 4/2010 | Ciesla et al. |
| 2010/0109486 A1 | 5/2010 | Polyakov et al. |
| 2010/0121928 A1 | 5/2010 | Leonard |
| 2010/0141608 A1 | 6/2010 | Huang et al. |
| 2010/0142516 A1 | 6/2010 | Lawson et al. |
| 2010/0162109 A1 | 6/2010 | Chatterjee et al. |

(56) References Cited

U.S. PATENT DOCUMENTS

| | | |
|---|---|---|
| 2010/0171719 A1 | 7/2010 | Craig et al. |
| 2010/0171720 A1 | 7/2010 | Craig et al. |
| 2010/0177050 A1 | 7/2010 | Heubel et al. |
| 2010/0182245 A1 | 7/2010 | Edwards et al. |
| 2010/0232107 A1 | 9/2010 | Dunn |
| 2010/0237043 A1 | 9/2010 | Garlough |
| 2010/0295820 A1 | 11/2010 | Kikin-Gil |
| 2010/0296248 A1 | 11/2010 | Campbell et al. |
| 2010/0298032 A1 | 11/2010 | Lee et al. |
| 2010/0302199 A1 | 12/2010 | Taylor et al. |
| 2010/0321335 A1 | 12/2010 | Lim et al. |
| 2011/0001613 A1 | 1/2011 | Ciesla et al. |
| 2011/0011650 A1 | 1/2011 | Klinghult |
| 2011/0012851 A1 | 1/2011 | Ciesla et al. |
| 2011/0018813 A1 | 1/2011 | Kruglick |
| 2011/0029862 A1 | 2/2011 | Scott et al. |
| 2011/0043457 A1 | 2/2011 | Oliver et al. |
| 2011/0060998 A1 | 3/2011 | Schwartz et al. |
| 2011/0074691 A1 | 3/2011 | Causey et al. |
| 2011/0120784 A1 | 5/2011 | Osoinach et al. |
| 2011/0148793 A1 | 6/2011 | Ciesla et al. |
| 2011/0148807 A1 | 6/2011 | Fryer |
| 2011/0157056 A1 | 6/2011 | Karpfinger |
| 2011/0157080 A1 | 6/2011 | Ciesla et al. |
| 2011/0163978 A1 | 7/2011 | Park et al. |
| 2011/0175838 A1 | 7/2011 | Higa |
| 2011/0175844 A1 | 7/2011 | Berggren |
| 2011/0181530 A1 | 7/2011 | Park et al. |
| 2011/0193787 A1 | 8/2011 | Morishige et al. |
| 2011/0194230 A1 | 8/2011 | Hart et al. |
| 2011/0241442 A1 | 10/2011 | Mittleman et al. |
| 2011/0254672 A1 | 10/2011 | Ciesla et al. |
| 2011/0254709 A1 | 10/2011 | Ciesla et al. |
| 2011/0254789 A1 | 10/2011 | Ciesla et al. |
| 2012/0032886 A1 | 2/2012 | Ciesla et al. |
| 2012/0038583 A1 | 2/2012 | Westhues et al. |
| 2012/0043191 A1 | 2/2012 | Kessler et al. |
| 2012/0056846 A1 | 3/2012 | Zaliva |
| 2012/0062483 A1 | 3/2012 | Ciesla et al. |
| 2012/0080302 A1 | 4/2012 | Kim et al. |
| 2012/0098789 A1 | 4/2012 | Ciesla et al. |
| 2012/0105333 A1 | 5/2012 | Maschmeyer et al. |
| 2012/0120357 A1 | 5/2012 | Jiroku |
| 2012/0154324 A1 | 6/2012 | Wright et al. |
| 2012/0193211 A1 | 8/2012 | Ciesla et al. |
| 2012/0200528 A1 | 8/2012 | Ciesla et al. |
| 2012/0200529 A1 | 8/2012 | Ciesla et al. |
| 2012/0206364 A1 | 8/2012 | Ciesla et al. |
| 2012/0218213 A1 | 8/2012 | Ciesla et al. |
| 2012/0218214 A1 | 8/2012 | Ciesla et al. |
| 2012/0223914 A1 | 9/2012 | Ciesla et al. |
| 2012/0235935 A1 | 9/2012 | Ciesla et al. |
| 2012/0242607 A1 | 9/2012 | Ciesla et al. |
| 2012/0306787 A1 | 12/2012 | Ciesla et al. |
| 2013/0019207 A1 | 1/2013 | Rothkopf et al. |
| 2013/0127790 A1 | 5/2013 | Wassvik |
| 2013/0141118 A1 | 6/2013 | Guard |
| 2013/0215035 A1 | 8/2013 | Guard |
| 2014/0043291 A1 | 2/2014 | Ciesla et al. |
| 2014/0160063 A1 | 6/2014 | Yairi et al. |
| 2014/0160064 A1 | 6/2014 | Yairi et al. |
| 2014/0210789 A1* | 7/2014 | Ciesla .................... G06F 3/016 345/174 |

FOREIGN PATENT DOCUMENTS

| | | |
|---|---|---|
| CN | 1882460 A | 12/2006 |
| JP | 10255106 | 9/1998 |
| JP | H10255106 | 9/1998 |
| JP | 2006268068 A | 10/2006 |
| JP | 2006285785 A | 10/2006 |
| JP | 2009064357 A | 3/2009 |
| KR | 20000010511 | 2/2000 |
| KR | 100677624 B | 1/2007 |
| WO | 2004028955 A2 | 4/2004 |
| WO | 2008037275 A | 4/2008 |
| WO | 2009002605 A | 12/2008 |
| WO | 2009044027 A2 | 4/2009 |
| WO | 2009067572 A2 | 5/2009 |
| WO | 2009088985 A | 7/2009 |
| WO | 2010077382 A | 7/2010 |
| WO | 2010078596 A | 7/2010 |
| WO | 2010078597 A | 7/2010 |
| WO | 2011003113 A | 1/2011 |
| WO | 2011087816 A | 7/2011 |
| WO | 2011087817 A | 7/2011 |
| WO | 2011112984 A | 9/2011 |
| WO | 2011133604 A | 10/2011 |
| WO | 2011133605 A | 10/2011 |

OTHER PUBLICATIONS

Jeong et al., "Tunable Microdoublet Lens Array," Optical Society of America, Optics Express; vol. 12, No. 11. May 31, 2004, 7 Pages.

Preumont, A. Vibration Control of Active Structures: An Introduction, Jul. 2011.

Essilor. "Ophthalmic Optic Files Materials," Essilor International, Ser 145 Paris France, Mar. 1997, pp. 1-29, [retrieved on Nov. 18, 2014]. Retrieved from the internet. URL: <http://www.essiloracademy.eu/sites/default/files/9.Materials.pdf>.

Lind. "Two Decades of Negative Thermal Expansion Research: Where Do We Stand?" Department of Chemistry, the University of Toledo, Materials 2012, 5, 1125-1154; doi:10.3390/ma5061125, Jun. 20, 2012 pp. 1125-1154, [retrieved on Nov. 18, 2014]. Retrieved from the internet. URL: <https://www.google.com/webhp?sourceid=chrome-instant&ion=1&espv=2&ie=UTF-8#q=materials-05-01125.pdf>.

* cited by examiner

METHOD FOR ACTUATING A TACTILE INTERFACE LAYER

CROSS-REFERENCE TO RELATED APPLICATIONS

This application claims the benefit of U.S. Provisional Application No. 61/871,264, filed on 28 Aug. 2013, which is incorporated in its entirety by this reference.

This application is related to U.S. application Ser. No. 11/969,848, filed on 4 Jan. 2008; U.S. application Ser. No. 12/319,334, filed on 5 Jan. 2009; U.S. application Ser. No. 12/497,622, filed on 3 Jul. 2009, which are all incorporated in their entirety by this reference.

TECHNICAL FIELD

This invention relates generally to tactile user interfaces, and more specifically to a new and useful mountable systems and methods for selectively raising portions of a surface of the user interface of a device.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. First Method

Figure 1:
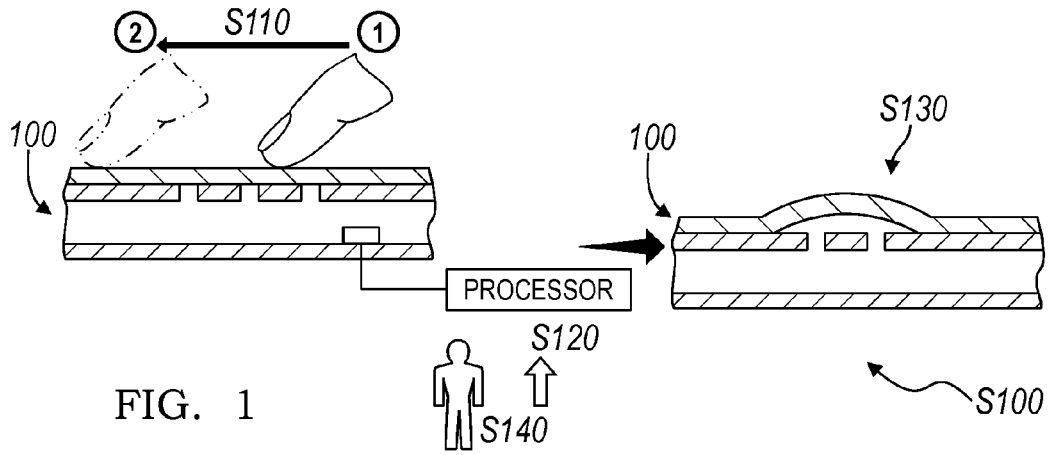
FIG. 1 is a schematic representation of the method of the preferred embodiments.

As shown in FIG. 1, the method S100 for actuating a tactile interface layer 100 of a device that defines a surface with a deformable region of the preferred embodiments includes: detecting a gesture of the user along the surface of the tactile interface layer that includes a movement of a finger of the user from a first location (1) to a second location (2) on the surface Step S110; interpreting the gesture as a command for the deformable region Step S120; and manipulating the deformable region of the surface based on the command Step S130. The method S100 for actuating a tactile interface layer 100 may also include the step of receiving a user input for a particular interpretation of a gesture as a command Step S140. The step of receiving a user input for a particular interpretation of a gesture as a command Step S140 may include receiving a user input from the user of the device, but may alternatively include receiving a user input from a person remote from the device, for example, a third party such as the manufacturer or a second user. However, the user input for a particular interpretation of a gesture as a command may be received from any other suitable user. The method S100 is preferably applied to a tactile interface layer 100 that is to be used with an electronic device and, more preferably, in an electronic device that benefits from an adaptive user interface. The electronic device may include a display and may include a touch sensor. For example, the electronic device may be an automotive console, a steering wheel, a desktop computer, a laptop computer, a tablet computer, a television, a radio, a desk phone, a mobile phone, a PDA, a personal navigation device, a personal media player, a camera, a watch, a remote control, a mouse, a trackpad, or a keyboard. The tactile interface layer 100 may, however, be used as the user interface for any suitable device that interfaces with a user in a tactile and/or visual manner. The tactile interface layer 100 is preferably integrated with the device, for example, in the variation wherein the tactile interface layer 100 includes a sensor 140, the tactile interface layer 100 is preferably assembled into the device and presented to the user as one unit. Alternatively, the tactile interface layer 100 may function as an accessory to a device, the user may be presented the tactile interface layer 100 and the device as two separate units wherein, when coupled to each other, the tactile interface layer 100 functions to provide tactile guidance to the user and/or to receive user inputs. However, the method S100 may be applied to any other suitable arrangement of the tactile interface layer 100.

Figure 2:
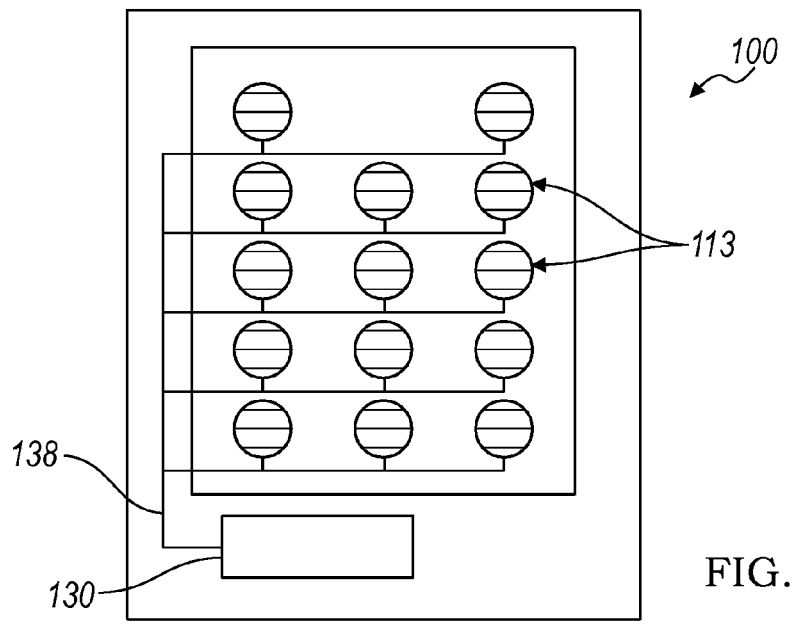
FIG. 2 is a top view of a variation of the tactile interface layer.
Figure 3:
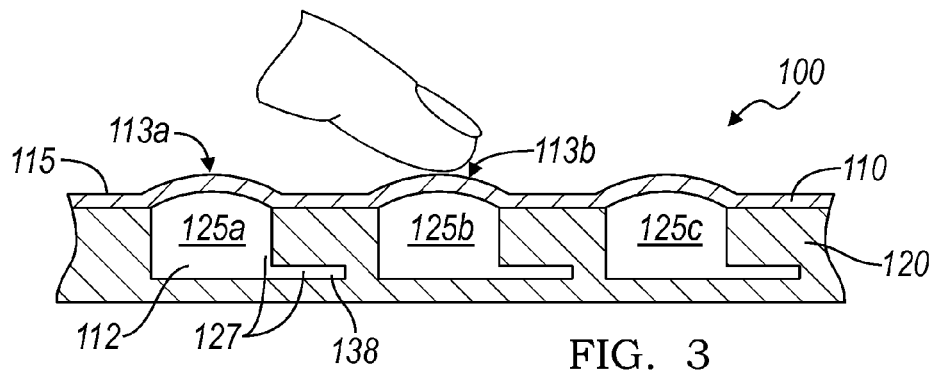
FIG. 3 is a cross sectional view of a variation of the tactile interface layer.
Figure 4A:
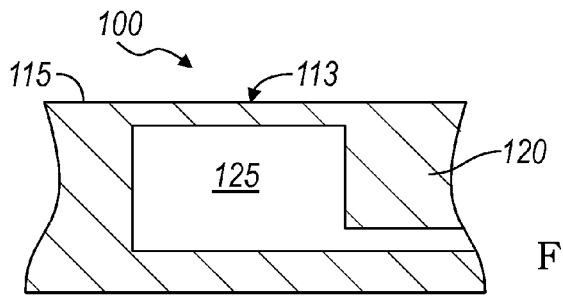
FIGS. 4A, 4B, and 4C are cross-sectional views illustrating the operation of a deformable region of a tactile interface layer.
Figure 4B:
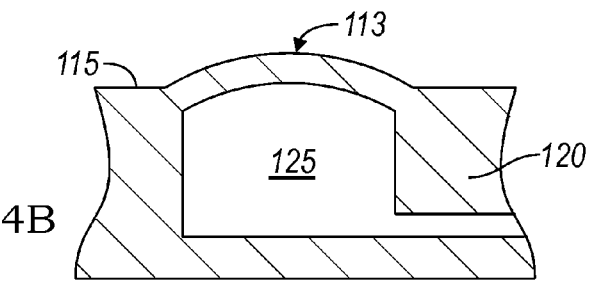
Figure 4C:
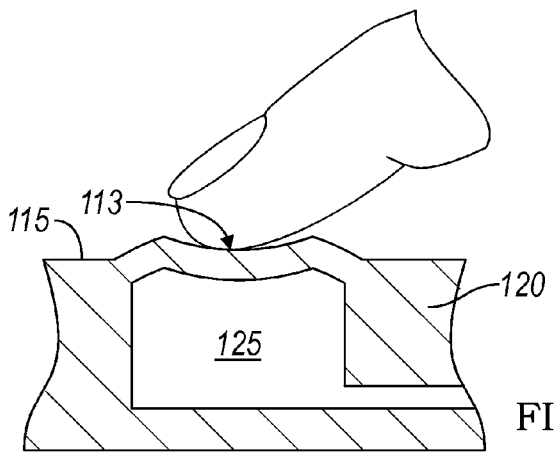
Figure 5:
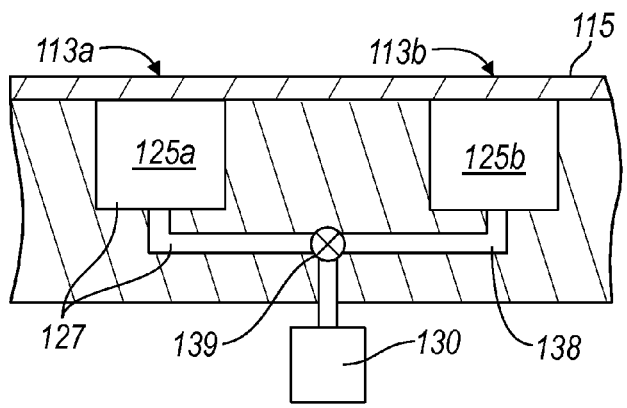
FIG. 5 is a cross sectional view of a variation of the tactile interface layer with a valve.
Figure 10A:
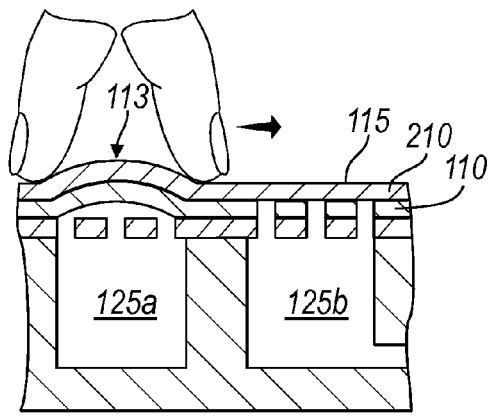
Figure 10B:
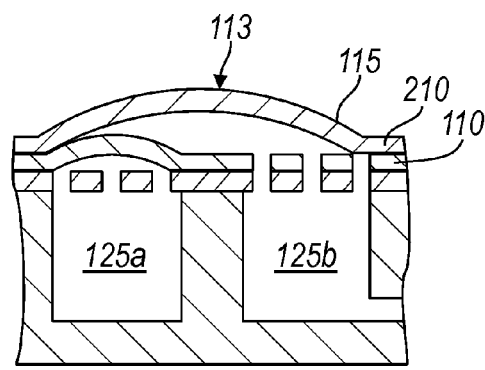

The method S100 of the preferred embodiments is preferably applied to any suitable tactile interface layer that includes deformable regions. In particular, as shown in FIGS. 2-4, the method S100 of the preferred embodiments may be applied to the user interface system as described in U.S. application Ser. Nos. 11/969,848, 12/319,334, and 12/497,622. The tactile interface layer may be applied over a display, but may alternatively be applied on to a surface without a display. However, the tactile interface layer may be applied to any suitable surface of a device that may benefit from a tactile interface. The tactile interface layer 100 of this variation preferably includes a layer 110 that defines a surface 115, a substrate that at least partially defines a fluid vessel that includes a volume of fluid 112, and a displacement device 130 coupled to the fluid vessel that manipulates the volume of fluid 112 to expand and/or contract at least a portion of the fluid vessel, thereby deforming a particular region 113 of the surface 115. The substrate may also include a support region that substantially prevents inward deformation of the layer no (for example, inward deformation into the fluid vessel). The tactile interface layer 100 of this variation may also include a second layer 210 (as shown in FIGS. 10a and 10b) that allows for an additional degree of deformation of the surface 115. In this variation of the tactile interface layer 100, the step of manipulating the deformable region of the surface based on the command Step S130 preferably includes manipulating the fluid within the fluid vessel. In particular, the displacement device 130 is preferably actuated to manipulate the fluid within the fluid vessel to deform a particular region 113 of the surface. The fluid vessel preferably includes a cavity 125 and the displacement device 130 preferably influences the volume of fluid 112 within the cavity 125 to expand and retract the cavity 125. The fluid vessel may alternatively be a channel 138 or a combination of a channel 138 and a cavity 125, as shown in FIG. 3b. The fluid vessel may also include a second cavity 125b in addition to a first cavity 125a. When the second cavity 125b is expanded, a second particular region 113b on the surface 115 is preferably deformed. The displacement device 130 preferably influences the volume of fluid 112 within the second cavity 125b independently of the first cavity 125a. As shown in FIG. 5, the tactile interface layer of this variation may include a valve 139 that functions to direct fluid within the tactile interface layer 100. In this variation, the step of manipulating the fluid within the fluid vessel may include actuating the valve 139 to direct fluid within the tactile interface layer 100. Alternatively, the user interface enhancement system 100 may include a second displacement device 130 that functions to influence the volume of fluid 112 within the second cavity 125b to expand and retract the second cavity 125b, thereby deforming a second particular region 113b of the surface. The second cavity 125b is preferably similar or identical to the cavity 125, but may alternatively be any other suitable kind of cavity. The following examples may be described as expanding a fluid vessel that includes a cavity 125 and a channel 138, but the fluid vessel may be any other suitable combination of combination of cavity 125 and/or channel 138. However, any other suitable type of tactile interface layer 100 may be used.

The tactile interface layer 100 preferably functions to provide tactile guidance to a user when using a device that the tactile interface layer 100 is applied to. As shown in FIG. 4, the surface 115 of the tactile interface layer 100 preferably remains flat until tactile guidance is to be provided to the user at the location of the particular region 113. In the variation of the tactile interface layer 100 as described above, the displacement device 130 then preferably expands the cavity 125 (or any other suitable portion of the fluid vessel) to expand the particular region 113 outward, forming a deformation that may be felt by a user (referenced throughout this document as a "tactilely distinguishable formation"), and providing tactile guidance for the user. The expanded particular region 113 preferably also provides tactile feedback to the user when he or she applies force onto the particular region 113 to provide input. This tactile feedback may be the result of Newton's third law, whenever a first body (the user's finger) exerts a force on a second body (the surface 115), the second body exerts an equal and opposite force on the first body, or, in other words, a passive tactile response. Alternatively, the displacement device 130 may retract the cavity 125 to deform the particular region 113 inward. However, any other suitable method of deforming a particular region 113 of the tactile interface layer 100 may be used.

The tactile interface layer 100 preferably includes a sensor that functions to detect the gesture of the user, for example, a capacitive sensor that functions to detect the motion of a finger of the user from the first location to the second location. Alternatively, in the variation of the tactile interface layer 100 as described above, a pressure sensor located within the fluid vessel may be used to detect changes in pressure within the fluid vessel to detect the motion of a finger of the user from the first location to the second location. Alternatively, the sensor may be a sensor included in the device to which the tactile interface layer 100 is applied to, for example, the device may include a touch sensitive display onto which the tactile interface layer 100 is overlaid. The gesture of the user may be detected using the sensing capabilities of the touch sensitive display. However, any other suitable gesture detection may be used.

Similarly, the tactile interface layer 100 preferably includes a processor that functions to interpret the detected gesture as a command. The processor preferably functions to discern between a gesture that is provided by the user to be a command a gesture that may be provided by the user but not meant to be a command, for example, an accidental brush of the finger along the surface of the tactile interface layer 100. The processor may include a storage device that functions to store a plurality of gesture and command associations and/or user preferences for interpretations of gestures as commands. The processor may be any suitable type of processor and the storage device may be any suitable type of storage device, for example, a flash memory device, a hard-drive, or any other suitable type. The processor and/or storage device may alternatively be a processor and/or storage device included into the device that the tactile interface layer 100 is applied to. However, any other suitable arrangement of the processor and/or storage device may be used.

Figure 6:
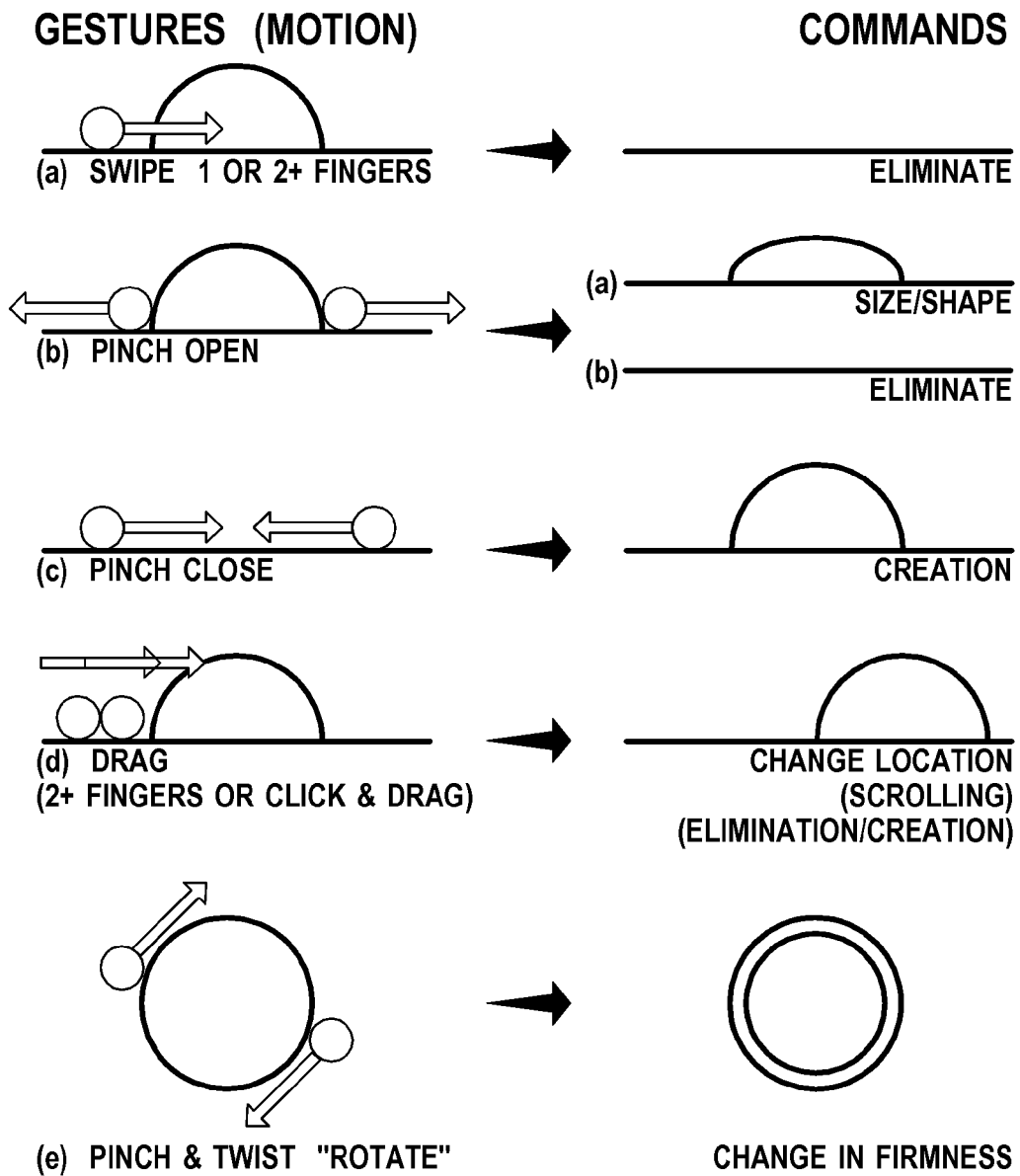
FIG. 6 is a schematic representation of a variety of gestures and exemplary interpretations as commands.

As shown in FIG. 6, a gesture may be one of a variety of movements of one or more fingers of the user across the surface 115 of the tactile interface layer 100. The gesture may be detected as a swipe from a first location to a second location arranged in any suitable location along the surface 115 of the tactile interface layer 100. Alternatively, this first variation of gesture may be detected as a swipe from a first location relative to a deformed particular region 113 to a second location relative to the deformed particular region 113. Detection of a gesture relative to a deformed particular region 113 may be particularly useful in the variation of the tactile interface layer 100 that includes a plurality of deformable regions and may function to allow the interpretation of the gesture as a command for a particular deformable region that is substantially proximal to the detected gesture. However, the gesture may be detected relative to any other suitable portion of the tactile interface layer.

The gesture may be a single finger moving from the first location to the second location on the surface 115, as shown in FIG. 6 (Example A). Alternatively, the gesture may include more than one finger, for example, two fingers, where the first finger moves from a first location to a second location and the second finger moves from a third location to a forth location, as shown in FIG. 6 (Examples B-E). In the variation where the gesture includes more than one finger, the fingers of the user preferably move substantially concurrently. Alternatively, the fingers may move one after the other, or in other words, a "staggered" gesture, for example, a first finger moves and then the second finger moves or the first finger starts moving and continues moving as the second finger starts to move. However, any other suitable temporal relationship between the fingers of the user during a gesture may be used.

In a first variation of the gesture, as shown in Example A, the finger or fingers of a user move from a first location to a second location in a "swiping" motion. In a second variation, at least two of the fingers of the user move apart from each other in a "pinch open" motion, as shown in Example B. In other words, a first finger moves from a first location to a second and a second finger moves from a third location to a fourth, where the second and fourth locations are farther apart from each other than the first and third. A third variation of the gesture may be thought of as opposite that of the second variation, where at least two of the fingers of the user move together in a "pinch close" motion, as shown in Example C. In a fourth variation of the gesture, at least two fingers of the user may move in substantially the same direction in a "drag" motion, as shown in Example D. In other words, a first finger moves from a first location to a second and a second finger moves from a third location substantially adjacent to the first location to a fourth location substantially adjacent to the second location. In this variation, the first and second fingers remain substantially equidistant from the beginning of the gesture to the end of the gesture. In a fifth variation, as shown in Example E, the first and second fingers also remain substantially equidistant from the beginning of the gesture to the end of the gesture. In this fifth variation, the first finger moves from a first location to a second location and the second finger moves from a third to a fourth location along the surface by rotating about a point that is substantially in between the distance between the first and third locations. In other words, the fingers of a user rotate about a center that is substantially defined by the distance between the initial positions of the first and second fingers of the user. While the gesture is preferably one of the variations as described above, the gesture may be any other suitable combination of the above variations and/or any other suitable type of gesture.

As shown in FIG. 6, the gesture may be interpreted as one of a variety of commands for the deformable particular region 113. Examples A-E show exemplary parings between a gesture and the interpreted command. However, any other suitable type of association between gesture and command may be used. In a first variation, the command may be to un-deform (or "eliminate") the deformed particular region 113, as shown in FIG. 6 (Examples A and B). In a second variation, the command may be to change the shape of the deformed particular region, as shown in FIG. 6 (Example B), for example, to enlarge the surface area of the deformed particular region and/or to change overall shape of the deformed particular region (e.g., from a substantially round button to a substantially square button). In a third variation, the command may be to actuate (or "create") the deformed particular region 113. This may be thought of as the opposite of the first variation of command. In a fourth variation, the command may be to change the location of a deformed particular region 113, as shown in FIG. 6 (Example D). In the variation of the tactile interface layer 100 that includes a plurality of deformable regions, the fourth variation may alternatively be thought of the "elimination" of the originally deformed particular region 113 at a first location and the "creation" of another deformed particular region 113 at a second location. The second location is preferably indicated by the gesture provided by the user. However, the location of the deformed particular region may be changed using any other suitable method. In a fifth variation, the command may be to change an already deformed particular region 113, for example, to change the firmness or the height of the deformed particular region 113, as shown in FIG. 6 (Example E). However, any other suitable type of change to the deformed particular region 113 may be used, for example, a gesture that is not in contact with the surface 115. In this variation, the sensor that detects the gesture may be a video sensor or a distance sensor that detects the motion of the user that is removed from the surface 115. Similarly, the gesture may include any other suitable body part of the user, for example, a hand, an arm, and/or a foot.

The command interpreted from the gesture along the surface 115 of the tactile interface layer is preferably one of the variations described above, but may alternatively be any suitable combination of the above variations or any other suitable type of command for the deformable region. In addition to a command for the deformable region, the gesture may also be interpreted as a command for the device, for example, when applied to a device that is a mobile phone, music player, or any other suitable device that outputs sound, the command may include a user command to change the volume of the sound output. Similarly, in a device that provides a visual output, the command may include a user command to change the brightness or any other suitable property of the visual output. However, any other suitable command for the device may be used.
Exemplary Interpretations of Gestures as Commands for the Deformable Region The following include exemplary interpretations of particular gestures as commands for the deformable region and implementation of the command using the variation of the tactile interface layer 100 as described in U.S. application Ser. Nos. 11/969,848, 12/319,334, and 12/497,622, which are incorporated in their entireties this reference.

Figure 7A:
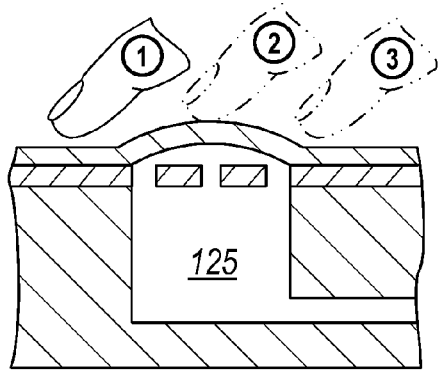
FIGS. 7A and 7B are schematic representations of a swiping gesture and the elimination of a deformed region as applied to the variation of the tactile interface layer in FIGS. 2-4.
Figure 7B:
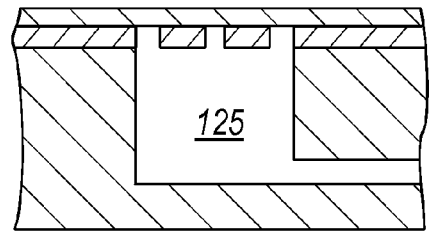

In a first exemplary interpretation, as shown in FIG. 6 (Examples A and B), a "swiping" gesture, as shown in FIGS. 7a and 7b, or a "pinch open" gesture may be interpreted as an "eliminate" command to un-deform the deformed particular region 113. The "swiping" motion and the "pinch open" gesture is substantially similar to a motion a user may make when moving an object away or to push out a crease, thus, it may be useful to associate such a gesture with the elimination of a deformation of the deformed particular region 113. The "swiping" and "pinch open" gesture may involve one and two fingers of the user, respectively, but may alternatively involve two and four fingers of the user, respectively, or any other suitable number of fingers of the user or any other suitable number of fingers of multiple users. In this exemplary interpretation, in the variation of the tactile interface layer 100 that includes a plurality of deformable regions, the location of the gesture relative to a deformed particular region 113 may be used to determine the deformed region that the user wishes to eliminate. For example, as shown in Example A and FIGS. 7a and 7b, the tactile interface layer 100 may detect that the finger of the user passes over a particular deformed particular region 113 and interprets the gesture as a command to eliminate the particular deformation. Alternatively, the tactile interface layer 100 may detect a command motion from the user and be prepared to eliminate a deformed particular region at a location later indicated by the user. For example, the swiping or pinch open gesture may indicate to the tactile interface layer 100 that the user desires to eliminate a particular deformed region. Upon detection of the gesture, the user interface 100 may actuate an operation mode that waits for a user to indicate the desired deformation to eliminate. The user may then indicate the desired location for the desired deformation to eliminate anywhere on the tactile interface layer 100. The location may be substantially adjacent to where the user provided the gesture, but may alternatively be substantially distal from where the user provided the gesture along the surface 115. However, the user may define their desired location using any other suitable method, for example, applying pressure to a particular location on the surface 115. However, any other suitable method to indicate the desired deformed region to eliminate may be used.

Figure 8A:
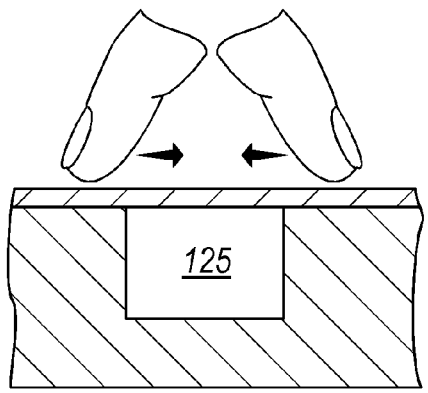
FIGS. 8A and 8B are schematic representations of a pinch open gesture and the creation of a deformed region as applied to the variation of the tactile interface layer in FIGS. 2-4.
Figure 8B:
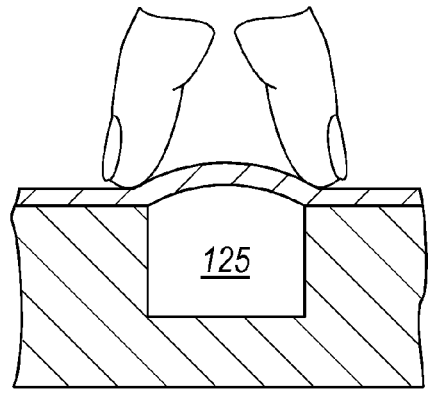

In a second exemplary interpretation, as shown in FIG. 6 (Example C) and in FIGS. 8a and 8b, a "pinch close" gesture may be interpreted as a "creation" command. The user may "create" the button for any suitable reason, for example, to mark a location on a screen, to mark an option, to mark a file for easy reference, or to indicate that tactile guidance is desired at a particular location. For example, as shown in FIGS. 8a and 8b, the user may draw two fingers together to indicate the desired location of a deformed particular region of the surface 113. The tactile interface layer 100 preferably detects the motion of the fingers and location along the fluid vessel and/or cavity 125 corresponding to a particular region 113 that is substantially adjacent to the location substantially central to the location of the fingers as the user draws the fingers is expanded and the desired particular region of the surface 113 is deformed, as shown in FIG. 8b. The user may alternatively draw more than two fingers together to better define a central location. Similar to the first exemplary interpretation, the tactile interface layer 100 may alternatively detect a gesture from the user and be prepared to expand a cavity 125 in a location indicated by the user. For example, the motion of drawing two fingers together may indicate to the tactile interface layer 100 that the user desires expansion of a cavity 125. Upon detection of the gesture, the user interface 100 may actuate an operation mode that waits for a user indication for the desired location for a deformed region of the surface. The user may then indicate the desired location for the deformed region of the surface anywhere on the tactile interface layer 100. The location may be substantially adjacent to where the user draws two fingers together, but may alternatively be substantially distal from where the user draws two fingers together. Alternatively, the user may indicate an arrangement of deformable regions to deform. For example, once a command to deform a particular region is interpreted, the user may indicate the desired arrangement of regions by providing a second gesture, such as to trace a shape on the surface 115 that may indicate, for example, a QWERTY keyboard configuration of deformable regions. The user may also indicate a desired shape of the deformed region of the surface. For example, the user may trace out a desired shape along the surface and the user interface 100 may function to deform the regions substantially adjacent to the traced shape along the surface. However, the user may define their desired location using any other suitable method, for example, applying pressure to a particular location on the surface 115. This variation is preferably used on the variation of the user interface system that includes a plurality of cavities 125 to provide the user with a plurality of options of the location of the deformed particular region of the surface 113, but may alternatively be used on a tactile interface layer 100 with any other suitable number of cavities 125. This may be a useful tactile experience where the device is a trackpad and the user draws his or her fingers together to create a pointing stick, such as the pointing stick trademarked by IBM as the TRACKPOINT and by Synaptics as the TOUCHSTYK (which are both informally known as the "nipple"). This allows a trackpad to be combined with a pointing stick where the two navigational interfaces are generally kept separate.

Figure 9A:
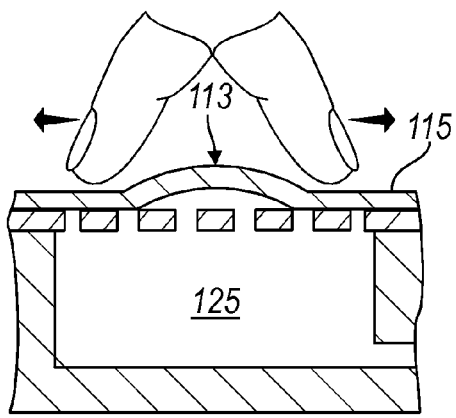
FIGS. 9A, 9B, 10A, and 10B are schematic representations of a pinch open gesture and a change of the deformable region in a first and second variation, respectively, as applied to the variation of the tactile interface layer in FIGS. 2-4.
Figure 9B:
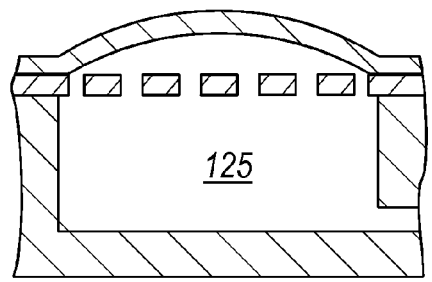

In a third exemplary interpretation, as shown in FIG. 6 (Example B), and FIGS. 9 and 10, the user may pull two fingers in a "pinch open" gesture to indicate the desire to expand (e.g., "spread out") a deformed particular region 113, for example, a user may pull two fingers in opposite directions away from a deformed particular region 113 or pull a finger in one direction away from a deformed particular region 113, indicating to the user interface system 100 that the total surface area of the deformation of the particular region 113 is to be increased, or "spread." In a first example, the deformable region of the tactile interface layer 100 may include a first and second degree of deformation, as shown in FIGS. 9a and 9b. In this example, the deformable region may require a first pressure to deform the first degree and a second pressure to deform the second degree; for example, the layer 110 may include a second portion that requires a higher pressure to deform. Alternatively, a first and second cavity 125a and 125b may be coupled to the deformable region such that the expansion of one of the first and second cavities 125a and 125b results in a portion of the deformable region deforming and the expansion of both the first and second cavities 125a and 125b results in the full deformable region deforming, as shown in FIGS. 10a and 10b. Alternatively, the degree of deformation of the particular region 113 may be decreased and substantially adjacent particular regions 113 may be expanded to produce the effect of spreading a deformation across a large surface area. Alternatively, the deformation of the particular region 113 may be maintained and substantially adjacent particular regions 113 can be expanded to substantially the same degree, providing the effect of enlarging a deformed particular region 113. The "spreading" of the deformed particular region 113 may be radially equidistant from the original deformed particular region 113. More specifically, the central point of the resulting deformed particular region 113 is preferably of the same central point of the original deformed particular region 113, as shown in FIG. 9. Alternatively, the central point of the resulting deformed particular region 113 may be different from the central point of the original deformed particular region 113, for example, a user may pull one finger away from the deformed particular region 113 in one direction, indicating expansion of the deformed particular region 113 in the indicated direction, thus moving the central point of the deformed particular region 113 towards the indicated direction, as shown in FIG. 10. Alternatively, the motion of two fingers pulled in opposite directions away from a deformed particular region 113 may indicate to the user interface system 100 to retract the cavity 125 and undeform the deformed particular region 113. However, the user interface system 100 may provide any other suitable active response to the motion of two fingers pulled in opposite directions away from a deformed particular region 113.

Figure 11A:
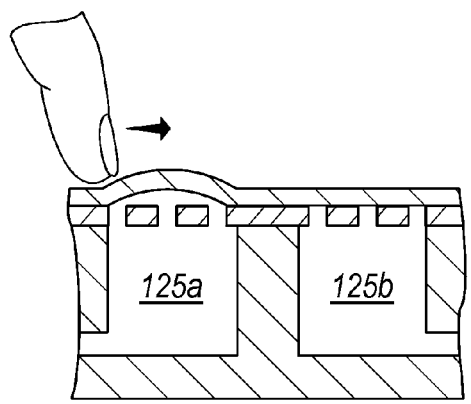
FIGS. 11A and 11B are schematic representations of a drag gesture and a change in location of the deformed region, as applied to the variation of the tactile interface layer in FIGS. 2-4.
Figure 11B:
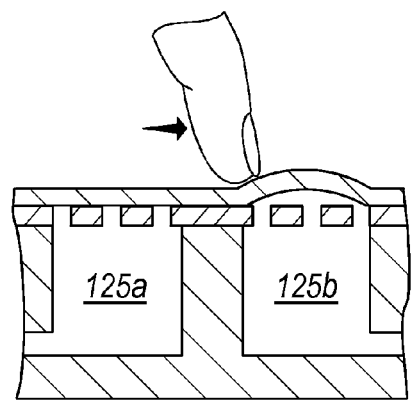

In a fourth exemplary interpretation, as shown in FIG. 6 (Example D), and FIGS. 11a and 11b, a "dragging" gesture may be interpreted as a command to move the deformed region from a first location to a second location along the surface 115. For example, once a first cavity 125 has been expanded and a particular region 113 has been deformed, the user may move his or her finger(s) along the surface 115 (preferably in contact with the surface 115, but may also be any other suitable distance away from the surface 115) to indicate successive particular regions 113 to deform. As a successive particular region 113 deforms, the prior particular region 113 preferably undeforms (in other words, the cavity 125 corresponding to the prior particular region 113 retracts), resulting in the user seemingly "dragging" the deformed particular region 113 along the surface 115. As the user moves his or her finger(s) along the surface 115, the successive particular regions 113 are preferably substantially adjacent or continuous with each prior particular region 113 to provide an experience akin to that of dragging a single object along a surface as opposed to touching a first object on a surface and then another object on the same surface. Alternatively, the deformed region may be "pushed" by the dragging gesture. In this variation, the dragging gesture preferably starts on one side of the deformed region and "pushes" the deformed region forward, as shown in FIGS. 11a and 11b. Subsequent particular regions 113 may be deformed forward of the original deformed region (instead of behind as described in the dragging example) to emulate the user pushing the deformed region from a first location to a second location along the surface 115. Yet alternatively, the user may indicate the deformed region that is to be moved by the start of the "dragging" gesture and then indicate the desired location of the moved deformed region by the end of the "dragging" gesture (in other words, where the user lifts the fingers off the surface 115 after the gesture). In this variation, the initial deformed particular region may be "eliminated" and a particular region at the desired location is "created" while deformable regions in between the eliminated and created deformations are not actuated. However, any other suitable actuation of deformable regions may be used.

In another aspect of the fourth exemplary interpretation, the user may dictate interaction between expanded cavities 125. For example, in the "dragging" example mentioned above, the user may "drag" an object along a path and particular regions 113 are expanded along the path. When an object is dragged over an existing deformed particular region 113, the object and the existing deformed particular region 113 may "react" based on actions of the user. For example, if the user pauses the dragging motion when the object is in the location of the existing deformed particular region 113, the deformed particular region 113 of the object and the existing deformed particular region 113 may seemingly "merge," for example, the total surface area of the existing deformed particular region 113 may grow as if the deformed particular region 113 of the object is added into the existing deformed particular region 113, similar to the third exemplary interpretation. The user may then also drag the "merged" particular region 113 to a different location. Alternatively, the existing deformed particular region 113 and the deformed particular region 113 for the object may "repel" each other, for example, the object may represent a baseball bat and the existing deformed particular region 113 may represent a ball, and the user may "hit" the ball with the baseball bat, seemingly "repelling" the two deformed particular regions. Similarly, the user may perform a splitting motion on an existing deformed particular region 113 and the existing deformed particular region 113 may "split," forming two distinct deformed particular regions 113. Each of the resulting two distinct deformed particular regions 113 is preferably of a smaller surface area than the original existing deformed particular region 113. An example of a splitting motion may be drawing two fingers apart substantially adjacent to the existing deformed particular region 113, However, any other suitable interaction between expanded cavities 125 may be implemented. While an active response to a command given by the user is preferably one of the examples described here, any active response to a command given by the user may be used.

A fifth exemplary interpretation, as shown in FIG. 6 (Example E), a rotating gesture may be interpreted as a command to change the characteristics of a deformed particular region 113 substantially proximal to the user input. Unlike the first, second, third, and fourth exemplary interpretations where the deformations have binary states of expanded and retracted, the command of the fifth exemplary interpretation allows for a plurality of states in between fully deformed and fully undeformed, respectively. For example, the rotating gesture around a deformed particular region 113 may be interpreted as a command to increase the stiffness of the deformation. This may be particular useful in a scenario where the command includes a command for the volume of the device and the deformed particular region 113 indicates the location of the "increase volume" button. When the user provides the rotating gesture around the button to indicate an input to increase the volume, the deformed particular region 113 may become progressively stiffer to the touch as the volume becomes higher and reaches the limit of the volume strength, indicating to the user through tactile means where along the volume scale they are currently. The rate of stiffness increase may be selected by the user to be tailored to their tactile preferences and/or sensitivity. The height of the deformed particular region 113 may also be adjusted as the volume level changes. To adjust the stiffness of the particular region of the surface 113, the displacement device 130 may adjust the amount of fluid that is displaced to expand the cavity 125. The more fluid that is displaced to expand the cavity 125, the stiffer the particular region 113 will feel to the touch. Similarly, the more fluid that is displaced to expand the cavity 125, the taller the deformation of the particular region 113. The user interface system 100 may also include a valve that directs the fluid displaced by the displacement device 130. In this variation, when additional fluid is desired to expand the cavity 125 to increase the stiffness and/or the height of the deformed particular region 113, the valve may direct additional fluid into the cavity 125.

While the interpretation of the gesture as a command is preferably one of the variations described above, the active response may alternatively be a combination of the variations described above or any other suitable combination of gestures and commands.

2. Second Method

Figure 12:
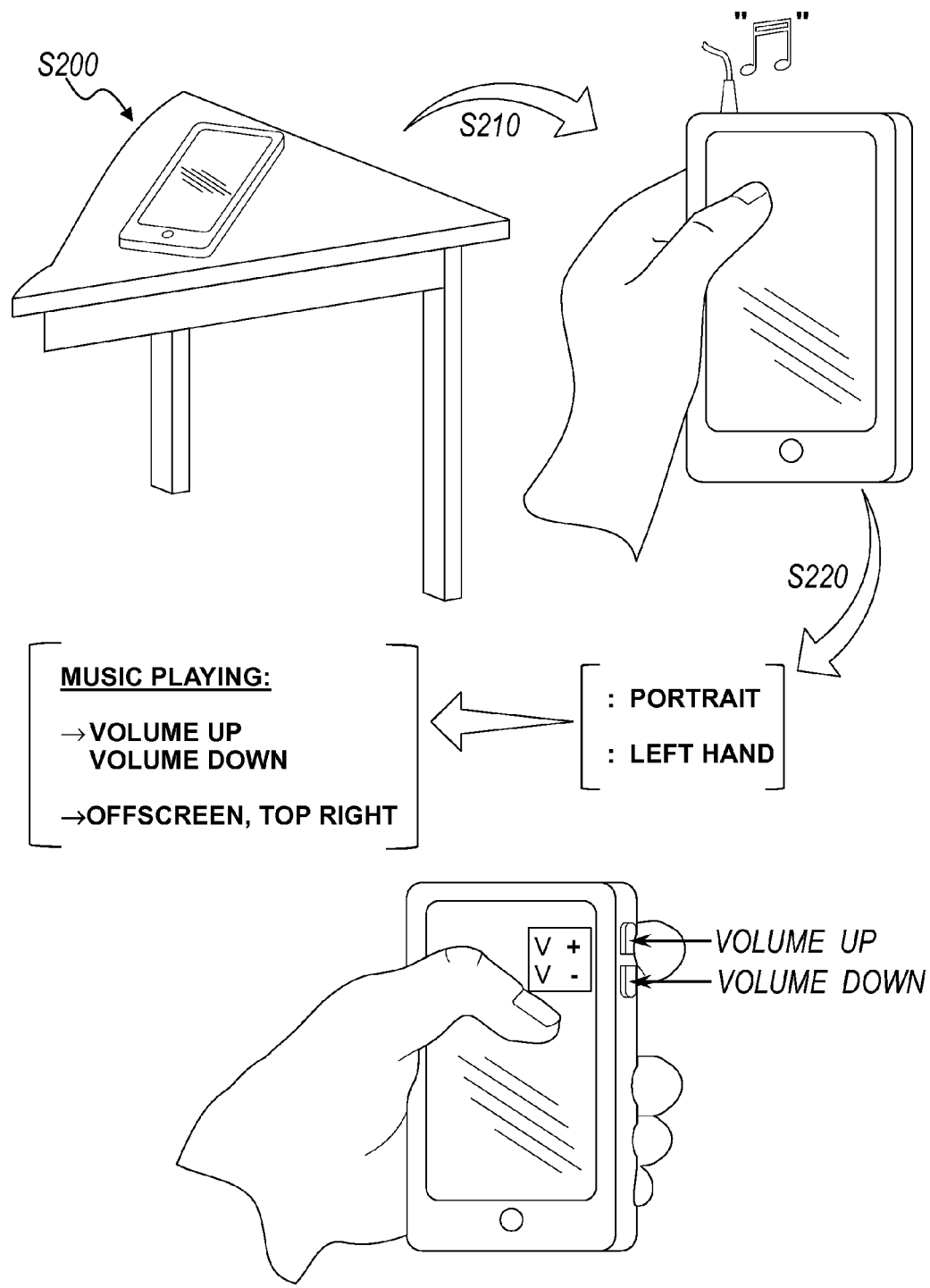
FIG. 12 is a flowchart representation of a variation of the method.

As shown in FIG. 12, the method S200 for responding to an implicit gesture includes: determining that a mobile computing device is held by a user in Block S210, the mobile computing device comprising a substrate defining a fluid channel, an attachment surface, and a fluid conduit fluidly coupled to the fluid channel and passing though the attachment surface, a tactile layer defining a deformable region and a peripheral region, the peripheral region adjacent the deformable region and coupled to the attachment surface, the deformable region adjacent the peripheral region, arranged over the fluid conduit, and disconnected from the attachment surface, and a displacement device configured to displace fluid through the fluid channel to transition the deformable region from a retracted setting to an expanded setting in Block S220; identifying a position of the mobile computing device in a hand of the user in Block S230; predicting a location of a future input into the mobile computing device in Block S240, the location proximal the deformable region; and transitioning the deformable region from the retracted setting to the expanded setting.

Generally, the second method S200 functions to predict a position of an upcoming input based on how a mobile computing device (e.g., a smartphone, a tablet, a PDA, personal music player, wearable device, watch, wristband, etc.) is held by a user and then to manipulate a dynamic tactile interface within the mobile computing device to yield a tactilely-distinguishable formation on the dynamic tactile interface proximal the predicted position of the upcoming input, a desired location of a button (i.e., input region), or shape of the dynamic tactile interface. Thus, the second method S200 can manipulate one or more deformable regions of a dynamic tactile interface within a mobile computing device to dynamically form tactilely-distinguishable formations on the mobile computing device, thereby improving convenience and ease of use of the mobile computing device.

In one example, while the mobile computing device is 'locked,' the second method S200 identifies that the mobile computing device is held in a portrait orientation in a user's left hand and thus transitions a deformable region over the top left quadrant (i.e., II Cartesian quadrant) of the display to define an physical "unlock" region adjacent a repositioned unlock slider rendered on the display. In this example, the second method S200 thus identifies how the mobile computing device is held and manipulates the dynamic tactile layer to place the physical unlock region in a position directly and naturally accessibly by the user's left thumb, thus increasing the ease with which the user may unlock the mobile computing device. In this example, the second method S200 can also adjust the position of a key (e.g., graphic) rendered on the display to align with the physical unlock region. Furthermore, for the unlock region that defines an elongated ridge indicating a swipe input to unlock, the second method S200 can modify a required input swipe direction to accommodate the user's hand position over the mobile computing device. In this example, when the mobile computing device held in a portrait orientation in the user's left hand, the second method S200 can set the swipe direction from right to left, whereas the second method S200 sets the swipe direction from left to right when the mobile computing device is held in a portrait orientation in the user's right hand.

In another example, while the mobile computing device is outputting audio (e.g., through headphones or through an internal speaker), the second method S200 identifies that the mobile computing device is held in a portrait orientation in a user's right hand and thus transitions a pair of deformable regions on the upper right region of the side of the mobile computing device into expanded settings to define a physical "volume up" key and a physical "volume down" key. In this example, the second method S200 thus identifies how the mobile computing device is held and manipulates the dynamic tactile layer to place physical volume adjustment regions in positions directly and naturally accessibly by the user's right index finger, thus increasing the ease with which the user may adjust the volume output of the mobile computing device. In this example, the second method S200 can also render a "+" image key and a "−" image key near the perimeter of the display to proximal the physical "volume up" and "volume down" keys to indicate control functions of the corresponding physical keys to the user.

In yet another example implementation, while the mobile computing device is in use (e.g., unlocked), the second method S200 determines the orientation of the mobile computing device relative to the horizon (e.g., portrait, landscape, 37° from horizontal) and transitions deformable regions within the dynamic tactile interface between expanded and retracted settings to maintain a physical "home" button proximal a current effective bottom center of the mobile computing device. Furthermore, in this example, the second method S200 can identify when the mobile computing device is rotated relative to the horizon and frequently update the position of the home button (e.g., a home button rendered on the display and a home button defined by a deformable region in the expanded setting), such as every five seconds or when the change in position of the mobile computing device exceeds a threshold position change while the mobile computing device is unlocked and in operation.

In another example implementation, once the mobile computing device is unlocked and a home screen with native applications rendered on the display, the second method S200 accesses a user application history including frequency and duration of user of native application displayed on the home screen. The second method S200 subsequently manipulates a set of deformable regions, each adjacent a displayed native application key, with a deformable region adjacent a native application key corresponding to a highest-use native application transitioned to a highest expanded position and with a deformable region adjacent a native application key corresponding to a lowest-use native application transitioned to a lowest expanded position or retained in the retracted position. Thus, in this example, the second method S200 can adjust the height of various deformable regions adjacent native application keys displayed within a home screen on the mobile computing device according to a likelihood that the user will select each native application based on application selection history.

Block S210 of the second method S200 recites determining that the mobile computing device is held by the user. Furthermore, Block S220 of the second method S200 recites identifying a position of the mobile computing device in a hand of the user. Generally, Block S210 and Block S220 function to interface with one or more sensors on the mobile computing device to detect that the mobile computing device is being held and how the mobile computing device is being held. For example, Blocks S210 and/or S220 can interface with one or more capacitive, resistive, optical, or other touch sensors arranged about the mobile computing device, such as on and around the display, the side of the mobile computing device, and/or a back surface of the mobile computing device, to detect a finger or hand hovering over or in contact with the mobile computing device. Blocks S210 and/or S220 can additionally or alternatively interface with one or more heat sensors within the mobile computing device to detect a local temperature change across a surface of the device and to correlate the temperature change with a hand holding the mobile computing device and/or interface with an accelerometer and/or a gyroscope to detect that the mobile computing device is being held, moved, and/or manipulated. For example, Block S210 can characterize accelerometer and/or gyroscope outputs as the mobile computing device being in a user's pocket while the user is walking, resting on a table or horizontal surface, or in a user's hand, etc. In another example, for the mobile computing device that is a wearable device (e.g., a smart wristband), Blocks S210 and S220 can interface with a heart rate sensor within the wearable device to detect the user's current heart rate, and the second method S200 can set a position of one or more deformable regions on the wearable device based on the user's current heart rate. Blocks S210 and S220 can similarly detect the user's current breathing rate or other vital sign, and the second method S200 can set a position of one or more deformable regions on the wearable device accordingly. Block S210 and S220 can additionally or alternatively interface with one or more bio-sensors integrated into the wearable device (or other computing device) to identify a user who is holding the wearable device based on bio-signature output from the bio-sensor, and Bocks S210 and S220 can thus adjust a position of one or more deformable regions (e.g., a location, a height, a firmness, and/or a unique gesture definition related to a deformable region) according to a preference of the identified user.

Block S220 can thus compare sensed touch areas to a touch area model to characterize a touch sensor output as a left hand or a right hand holding the mobile computing device in a portrait, landscape, or other orientation. Block S220 can similarly compare sensed heat areas to a heat area model to characterize a temperature sensor output as a left or right hand holding the mobile computing device in a portrait, landscape, or other orientation. Block S220 can also determine how the mobile computing device is held, such as by one or both hands of the user, based on how text or other inputs are entered into the mobile computing device, and Block S220 can further verify such characterization of user inputs substantially in real-time based on accelerometer and/or gyroscope data collected by sensors in the mobile computing device.

Blocks S210 and S220 can additionally or alternatively implement machine vision and/or machine learning to identify a face, body, clothing feature, etc. in a field of view of a (forward-facing) camera within the mobile computing device and thus determine that the mobile computing device is held and how the mobile computing device is held based on the identified face, body, clothing feature, etc. For example, Block S210 can implement facial recognition to determine that the mobile computing device is currently held, and Block S220 can implement face tracking to predict which hand the user is using to hold the mobile computing device. Block S210 and S220 can additionally or alternatively interface with a rear-facing camera within the mobile computing device to identify a hand (e.g., left or right) holding the mobile computing device. Blocks S210 and S220 can similarly identify a hand shape or hand motion (i.e., gesture) in a field of view of a camera within the mobile computing device (and not touching the mobile computing device), and subsequent Blocks of the second method S200 can set a deformable region position according to the identified hand shape or gesture.

Blocks S210 and S220 can additionally or alternatively determine if the mobile computing device is worn, in use, or in a particular location, on in an "ON" or "unlocked" state. For example, the second method S200 can selectively expand and retract one or more side, back, or on-screen deformable regions based on location data of the mobile computing device determined in Blocks S210 and S220 through a location (e.g., GPS) sensor within the mobile computing device. In this example, the second method S200 can thus selectively control the position of various deformable regions based on whether the user is at home, in his car, what app is running on the mobile computing device, etc.

However, Block S210 and Block S220 can function in any other way to determine that the mobile computing device is being held and to characterize how the mobile computing device is held.

Block S230 of the second method S200 recites predicting a location of a future input into the mobile computing device, the location proximal the deformable region. Generally, Block S230 functions to predict a location of an upcoming input based on how the mobile computing device is held (e.g., orientation of the mobile computing device, which hand(s) the user is using to hold the mobile computing device). In example similar to that described above, when the mobile computing device is "locked" and Blocks S210 and S220 determine that the user has picked up the mobile computing device with his left hand and is holding the mobile computing device in a portrait configuration, Block S230 can predict an upcoming input to include an "unlock" gesture. In this example, Block S230 can also predict that a convenient or preferred unlock input to be from the Quadrant I of the display (current top-right quadrant) to the Quadrant II of the display (current top-left quadrant) based the holding hand and orientation determined in Blocks S210 and S220. Block S230 can thus predict the upcoming input and a preferred location for the upcoming input.

In another example similar to that described above, when the mobile computing device is outputting sound, such as through a headphone stereo jack or internal speaker, and Blocks S210 and S220 determine that the user is holding the mobile computing device in his right hand in a portrait configuration, Block S230 can predict an upcoming input to include either of a "volume up" gesture and a "volume down" gesture. In this example, Block S230 can also predict that a convenient or preferred "volume up" and "volume down" input regions to lie off the display on an upper left lateral side of the mobile computing device such that user's right index finger falls substantially naturally on the "volume up" and "volume down" input regions. Block S230 can thus predict the upcoming input and a preferred or convenient location for the upcoming input based on the holding position of the mobile computing device determined in Blocks S210 and S220.

Block S240 of the second method S200 recites transitioning a deformable region from the retracted setting to the expanded setting. Generally, Block S240 functions to control the displacement device to displace fluid through the fluid channel to transition the deformable region from the retracted setting to the expanded setting. Block S240 can control one or more valves and/or one or more displacement devices within the mobile computing device to selectively expand and/or retract a particular subset of deformable regions, as described above or as described in U.S. patent application Ser. No. 12/319,334, filed on 5 Jan. 2009, which is incorporated in its entirety by this reference.

Therefore, the second method S200 can function to predict a future input and/or a preferred or convenient location for a future input and manipulate a deformable region on the mobile computing device to define a tangible button accordingly. The second method S200 can manipulate one or more deformable regions over a display within the mobile computing device (i.e., an on-screen physical button) and/or one or more deformable regions remote from the display (i.e., an off-screen physical button). As described above, the second method can therefore control one or more valves, displacement devices, etc. to form a physical volume up button, volume down button, lock button, unlock button, ringer or vibrator state button, home button, camera shutter button, and/or application selection button, etc. on the mobile computing device. The second method S200 can further manage outputs from a touch sensor to handle user inputs into selectively formed buttons, and the second method can also interface with a display driver to render visual input region identifiers adjacent (i.e., under) on-screen buttons and/or to render visual input identifiers near or pointing to off-screen buttons. For example, the second method S200 can detect a first gesture, selectively adjust the position of a particular deformable region accordingly, detect a subsequent gesture, assign a particular output type to the particular deformable region, and then generate an output of the particular output type when the particular deformable region is subsequently selected by the user. However, the second method S200 can function in any other way to estimate how the mobile computing device is held, to predict a type and/or location of a future input, and to manipulate a vertical position of one or more deformable regions accordingly to the predicted type and/or location of the future input.

An example of method S200 includes detecting an ongoing phone call on a mobile phone with a touchscreen or other sound output through a speaker of the mobile phone. Method S200 can further detect the orientation of the phone by detecting the touchscreen proximal and/or contacting an ear of the user, such as when the user holds the mobile phone up to the ear during the ongoing phone call. In response, method S200 can select and expand a deformable region corresponding to the ear and the speaker such that the deformable region forms an earpiece. Thus, method S200 can expand the earpiece to conform to the ear and focus sound output from the speaker toward to ear for improved hearing.

3. Third Method

Figure 14:
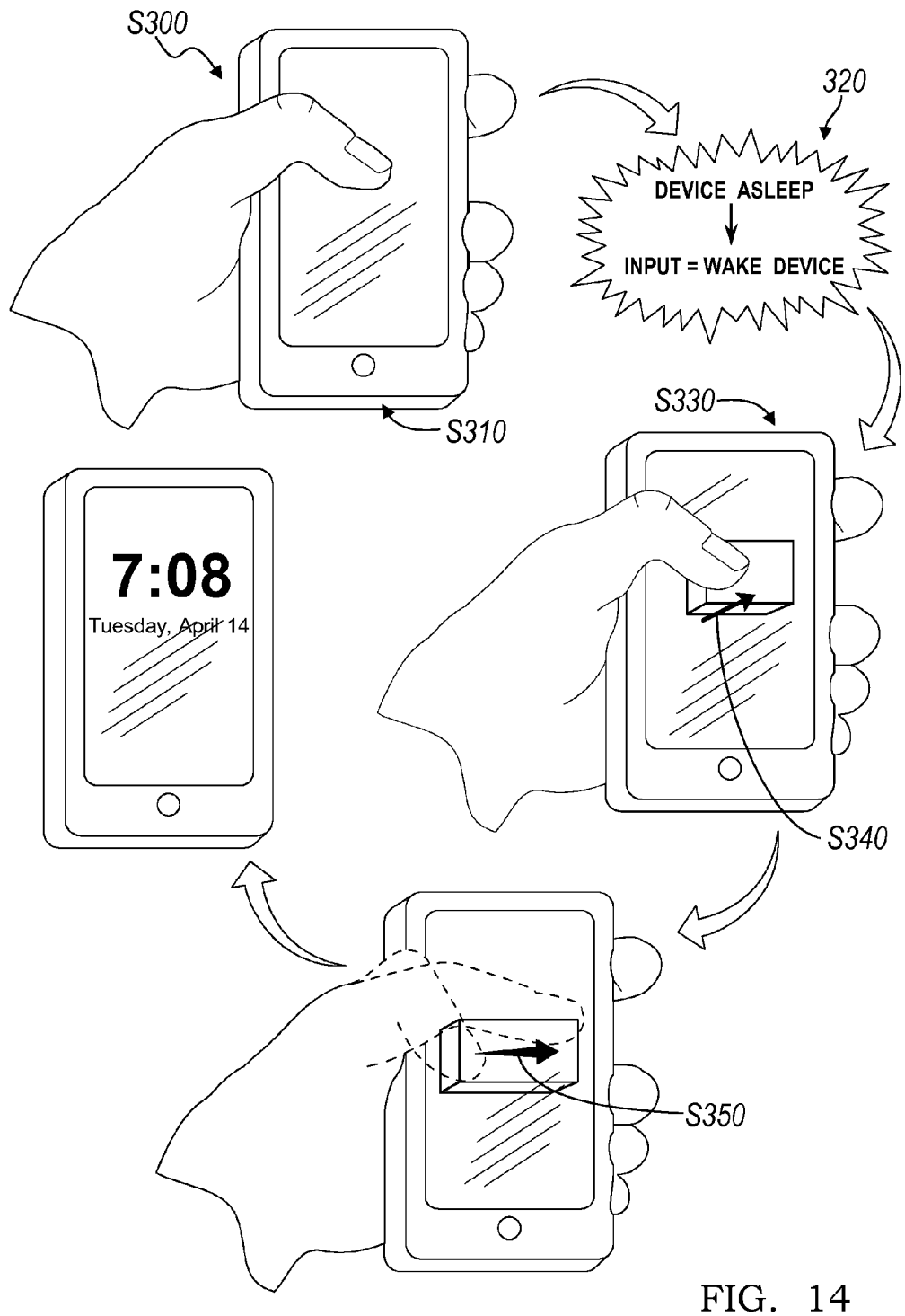
FIG. 14 is a flowchart representation of a variation of the method.

As shown in FIG. 14, the method S300 registers interaction with a dynamic tactile interface. The dynamic tactile interface includes a tactile layer and a substrate, the tactile layer defining a tactile surface, a deformable region, and a peripheral region adjacent the deformable region and coupled to the substrate opposite the tactile surface. The method S300 includes detecting an orientation of the device in Block S310; predicting a location of an upcoming input related to a native application executing on the device in Block S320; selecting a particular deformable region from a set of deformable regions, the particular deformable region substantially coincident the input location in Block S330; selectively transitioning the particular deformable region from a retracted setting into an expanded setting, the deformable region substantially flush with the peripheral region in the retracted setting and tactilely distinguishable from the peripheral region in the expanded setting in Block S340; and detecting an input, corresponding to the anticipated input, on the particular deformable region in Block S350.

Figure 19:
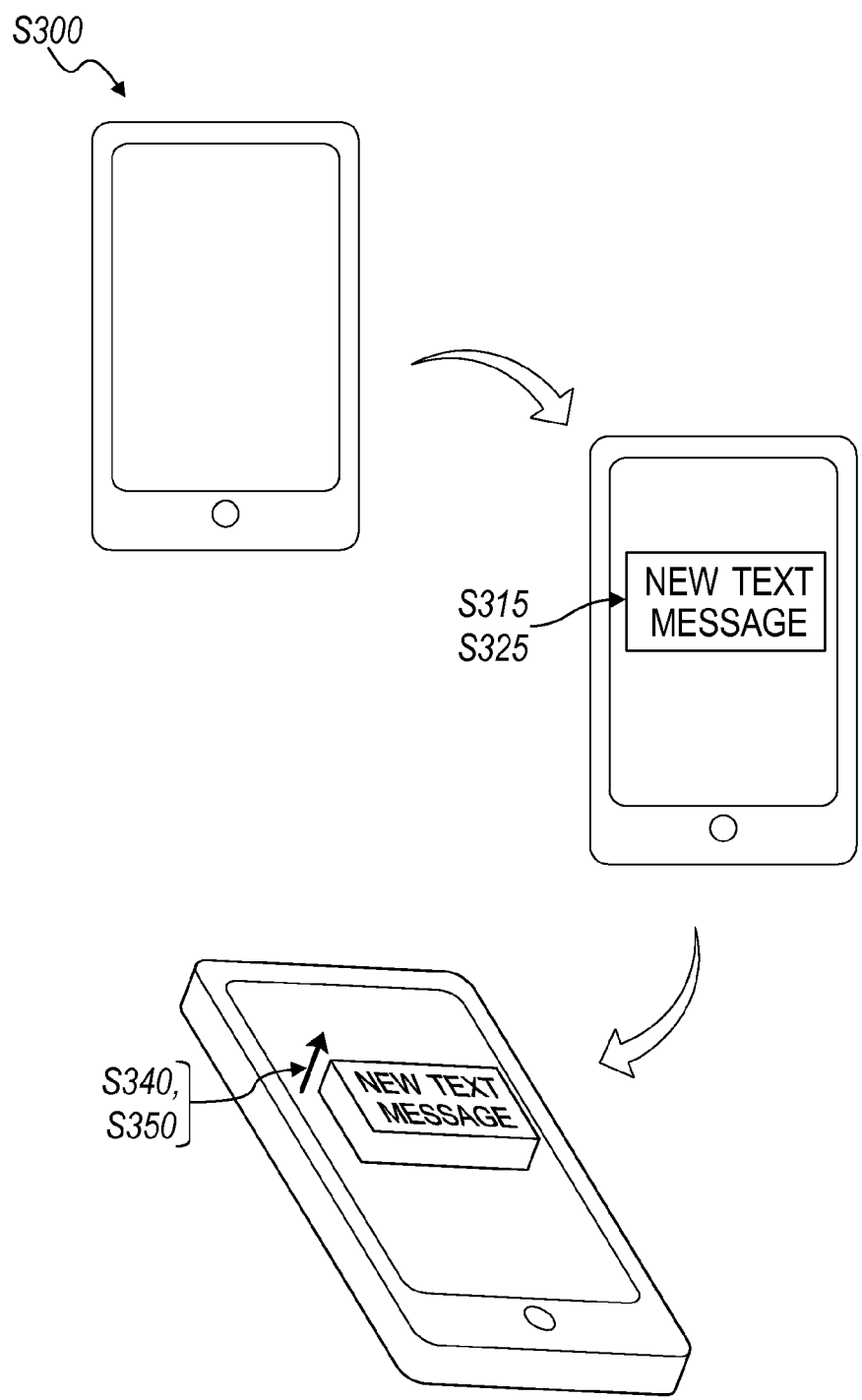
FIG. 19 is a flowchart representation of a variation of the method.

As shown in FIG. 19, one variation of method S300 includes receiving a notification event at the device in Block S315; detecting a particular location of an input object contacting a surface of the device prior to an upcoming input in Block S320; in response to the notification event, rendering a virtual communication on a region of a display of the device adjacent the particular location, the virtual communication corresponding to the notification event in Block S325; selecting a particular deformable region from a set of deformable region, the particular deformable region corresponding to the anticipated output and adjacent the particular location in Block S340; selectively transitioning the particular deformable region from a retracted setting substantially flush with the peripheral region to an expanded setting tactilely distinguishable from the peripheral region in Block S350; and detecting an input to the particular deformable region in Block S360.

Generally, method S300 functions to register an implicit event associated with an input, define a command for the dynamic tactile interface in response to the implicit event, and, in response to the command, modify the dynamic tactile interface according to an anticipated future input to the dynamic tactile interface. In particular, method S300 functions to correlate spatial orientation of the device and a native application executing on the device with a configuration of deformable regions of the dynamic tactile interface.

3.1 Hardware

The dynamic tactile interface can further include a display coupled to the substrate opposite the tactile layer and displaying an image of a key substantially aligned with the deformable region and/or a touch sensor coupled to the substrate and outputting a signal corresponding to an input on a tactile surface of the tactile layer adjacent the deformable region. The dynamic tactile interface can also include a housing that transiently engages a (mobile) computing device and transiently retains the substrate over a digital display of the (mobile) computing device.

Generally, the dynamic tactile interface can be implemented within or in conjunction with a computing device to provide tactile guidance to a user entering input selections through a touchscreen or other illuminated surface of the computing device. In particular the dynamic tactile interface defines one or more deformable regions of a tactile layer that can be selectively expanded and retracted to intermittently provide tactile guidance to a user interacting with the computing device. In one implementation, the dynamic tactile interface is integrated into or applied over a touchscreen of a mobile computing device, such as a smartphone or a tablet. For example, the dynamic tactile interface can include a set of round or rectangular deformable regions, wherein each deformable region is substantially aligned with a virtual key of a virtual keyboard rendered on the a display integrated into the mobile computing device, and wherein each deformable region in the set mimics a physical hard key when in an expanded setting. However, in this example, when the virtual keyboard is not rendered on the display of the mobile computing device, the dynamic tactile interface can retract the set of deformable regions to yield a substantially uniform (e.g., flush) tactile surface yielding reduced optical distortion of an image rendered on the display. In another example, the dynamic tactile interface can include an elongated deformable region aligned with a virtual 'swipe-to-unlock' input region rendered on the display such that, when in the expanded setting, the elongated deformable region provides tactile guidance for a user entering an unlock gesture into the mobile computing device. Once the mobile computing device is unlocked responsive to the swipe gesture suitably aligned with the virtual input region, the dynamic tactile interface can transition the elongated deformable region back to the retracted setting to yield a uniform surface over the display.

The dynamic tactile interface can alternatively embody an aftermarket device that adds tactile functionality to an existing computing device. For example, the dynamic tactile interface can include a housing that transiently engages an existing (mobile) computing device and transiently retains the substrate over a digital display of the computing device. The displacement device of the dynamic tactile interface can thus be manually or automatically actuated to transition the deformable region(s) of the tactile layer between expanded and retracted settings.

3.2 Method

Generally, Block S310 detects an orientation of the device. In particular, Block S310 can interface with a sensor incorporated into the device (e.g., a touch sensor, an optical sensor, an accelerometer, Global Positioning System, etc.) to detect the orientation of the device relative an external surface or body. For example, Block S310 can interface with an accelerometer built into the device to detect orientation of a mobile phone relative to a horizontal surface. The mobile phone can be oriented in a portrait orientation, such that a minor axis of the device can be substantially parallel to the horizontal surface. Likewise, the device can be oriented in a landscape orientation, such that the major axis of the device can be substantially parallel the horizontal surface. Alternatively, Block S310 can detect the device in any other orientation with any other sensor suitable for detecting orientation of the device. For example, Block S310 can detect, with an optical sensor, a display of the device resting on a horizontal surface. Block S310 can further detect the position of the device relative an external surface and/or object. In another example, Block S310 can detect an input object (e.g., a finger) resting on a surface the device. Block S310 can detect with a sensor, such as a capacitive, resistive, and/or optical sensor.

Generally, Block S320 predicts a location of an upcoming input related to a native application executing on the device. In particular, Block S320 can predict a particular input at a particular location in response to execution of the native application. For example, Block S320 can predict a contact with a surface of the device at the particular location. For example, Block S320 can identify a future input defined by a contact by an input object (e.g., a finger) on a portion of the touchscreen of the computing device corresponding to a virtual image rendered by the touchscreen.

Generally, Block S330 selects a particular deformable region from a set of deformable regions, the particular deformable region corresponding to the anticipated input and adjacent the input location. In particular, Block S330 can select the particular deformable region adjacent or arranged over the input location. Block S330 can select a particular deformable region with a shape substantially corresponding to the anticipated input. For example, if the anticipated input includes a slide gesture across the tactile surface, Block S330 can select a particular deformable region that forms an elongated and elevated button, such that the user can slide a finger across the expanded deformable region to enter the gesture into the device. Alternatively, Block S330 can select a set of particular deformable regions from the set of deformable regions, such that the set of particular deformable regions cooperatively correspond to the anticipated input.

Generally, Block S340 selectively transitions the particular deformable region from a retracted setting substantially flush with the peripheral region to an expanded setting tactilely distinguishable from the peripheral region. In particular, Block S340 can transition the particular deformable region(s) by displacing fluid from a fluid vessel into a cavity arranged under the deformable region. The tactile layer can include a substrate, a deformable region, and a peripheral region adjacent the deformable region and coupled to the substrate opposite the tactile layer, the substrate defining a fluid channel and cooperating with the deformable region to define a cavity filled with fluid. A displacement device (e.g., a pump) fluidly coupled to the fluid channel can displace fluid between the cavity and a reservoir fluidly coupled to the displacement device, thereby transitioning the deformable region between an expanded setting substantially elevated above the peripheral region and a retracted setting substantially flush with the peripheral region. Generally, the tactile layer can define one or more deformable regions operable between the expanded and retracted settings to intermittently define tactilely distinguishable formations over a surface, such as over a touch-sensitive digital display (e.g., a touchscreen), such as described in U.S. patent application Ser. No. 13/414,589. Thus, the displacement device can transition the deformable region into the expanded setting by displacing fluid from the fluid vessel into the cavity. Method S300 can additionally or alternatively transition the particular deformable region(s) using electromechanical actuation. For example, method S300 can be implemented with a "snap dome" deformable region.

Generally, Block S350 detects an input, corresponding to the anticipated input, to the particular deformable region. In particular, Block S350 detects an input at a sensor, such as a touch sensor integrated in a touchscreen display of the mobile computing device (e.g., a capacitive, resistive, or optical touch sensor). Alternatively, Block S350 can detect the input at a pressure sensor by detecting a change in pressure of the fluid in the cavity. An increase in pressure of the fluid in the cavity corresponds to depression of the deformable region into the cavity and, thus, an input to the dynamic tactile interface.

3.3 Example

Generally, method S300 functions to register interaction with the dynamic tactile interface by detecting an orientation of the device in Block 310, identifying an anticipated input corresponding to a native application currently executing on the device, the anticipated input associated with an input location of the device in Block S320; selecting a particular deformable region from a set of deformable regions, the particular deformable region corresponding to the anticipated input and adjacent the input location in Block S330; selectively transitioning the particular deformable region from a retracted setting substantially flush with the peripheral region to an expanded setting tactilely distinguishable from the peripheral region in Block S340; and detecting an input, corresponding to the anticipated input, to the particular deformable region in Block S350.

Figure 16:
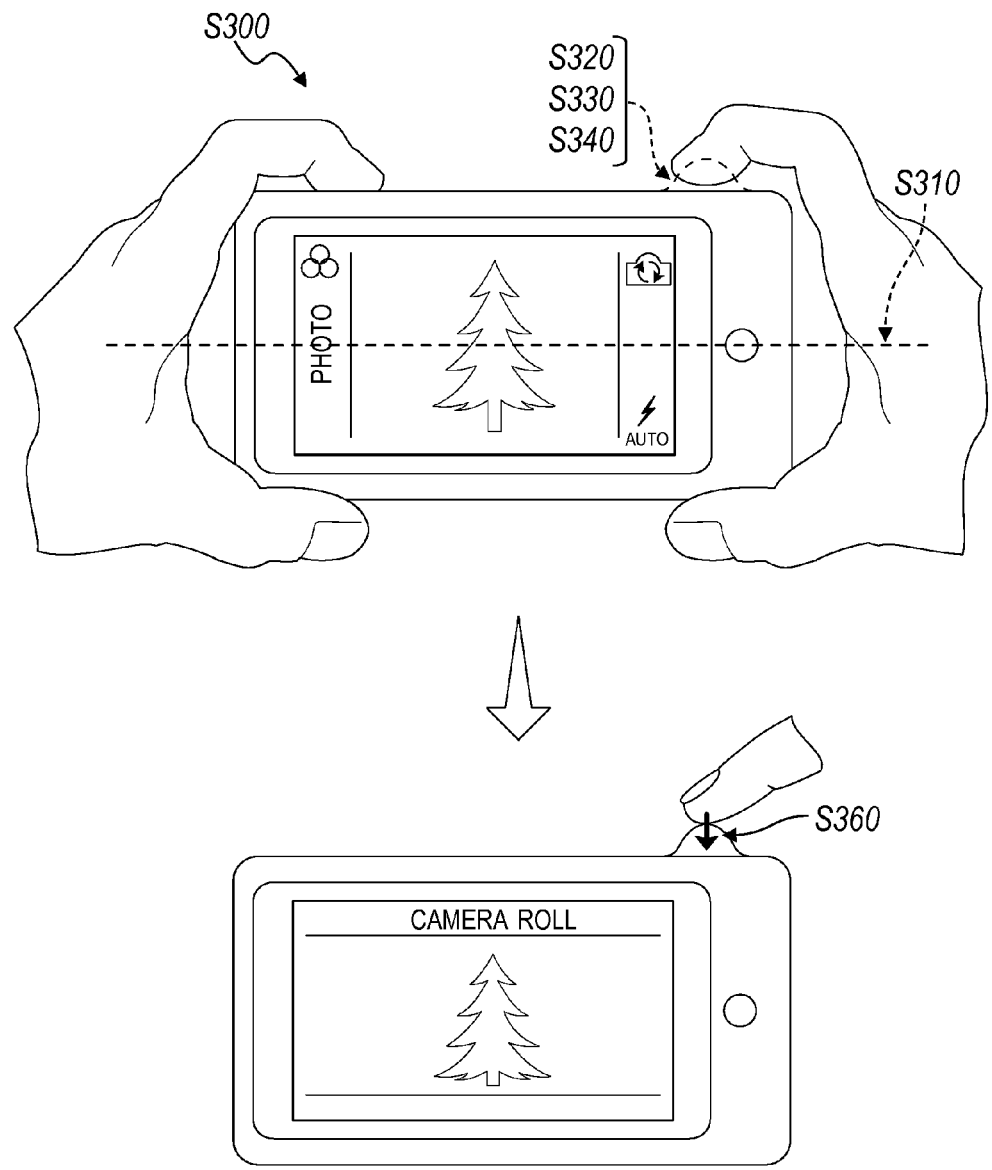
FIG. 16 is a flowchart representation of a variation of the method.

One example of method S300 includes detecting a mobile phone held by a user in a landscape orientation in Block S310. Block S310 can detect the mobile phone held by two hands of the user, the mobile phone situated between a thumb and an index finger of each hand as shown in FIG. 16. In Block S320, method S300 can detect a native camera application executing on the phone and anticipate a future input corresponding to selection of a shutter button to save an image captured by a lends and rendered by the native camera application on a display of the mobile phone. Block S320 further detects an anticipated input location of the future input corresponding to the location of one of the index fingers. Block S330 can select the deformable region at a location corresponding to the anticipated input location, and Block S340 can expand the deformable region. Thus, Blocks S330 and S340 can function to form a tactilely distinguishable shutter button substantially underneath the index finger that is resting on a surface (and holding) the mobile phone. Block S350 can detect depression of the tactilely distinguishable shutter button and trigger image capture with the camera accordingly.

Figure 17:
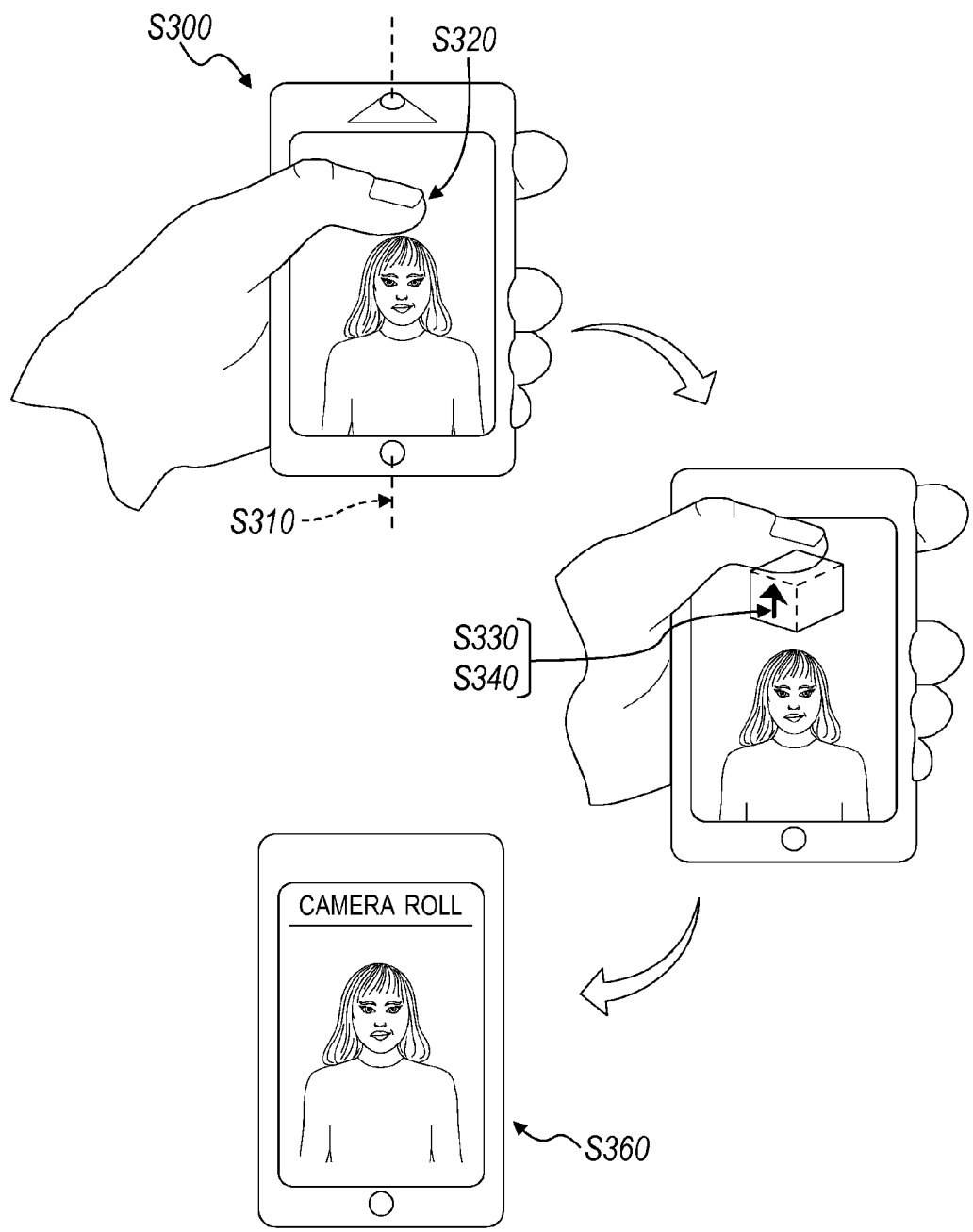
FIG. 17 is a flowchart representation of a variation of the method.

In a similar example, method S300 can include detecting the orientation of the mobile phone (e.g., in a portrait orientation) in Block S310. Block S320 can detect a camera application executing on the mobile phone, the camera application capturing an image detected by a forward-facing camera built into a face of the mobile phone proximal the display. Block S320 can anticipate an input, such as selection of a virtual shutter button in order to capture the image with the forward-facing camera (i.e., a "selfie") as shown in FIG. 17. The input location can correspond to the virtual shutter button rendered by the display. The virtual shutter button can be located at a center of the display, proximal an edge of the display. Alternatively, the input location can correspond to any location on any surface of the mobile device. For example, the input location can be centered on the display corresponding to an ergonomic location for contact by a finger (e.g., a thumb). The input location can also be arranged adjacent a finger holding the mobile phone and contacting a surface outside the display (e.g., an edge of the phone). Block S330 can select the particular deformable region corresponding to the ergonomic location and Block S340 can expand the deformable region into a tactilely distinguishable dome. Thus, Blocks S330 and S340 function to deploy a physical shutter button and Block S350 can detect depression of the physical shutter button, which can trigger the camera application to capture the image detected by the forward-facing camera.

Figure 18:
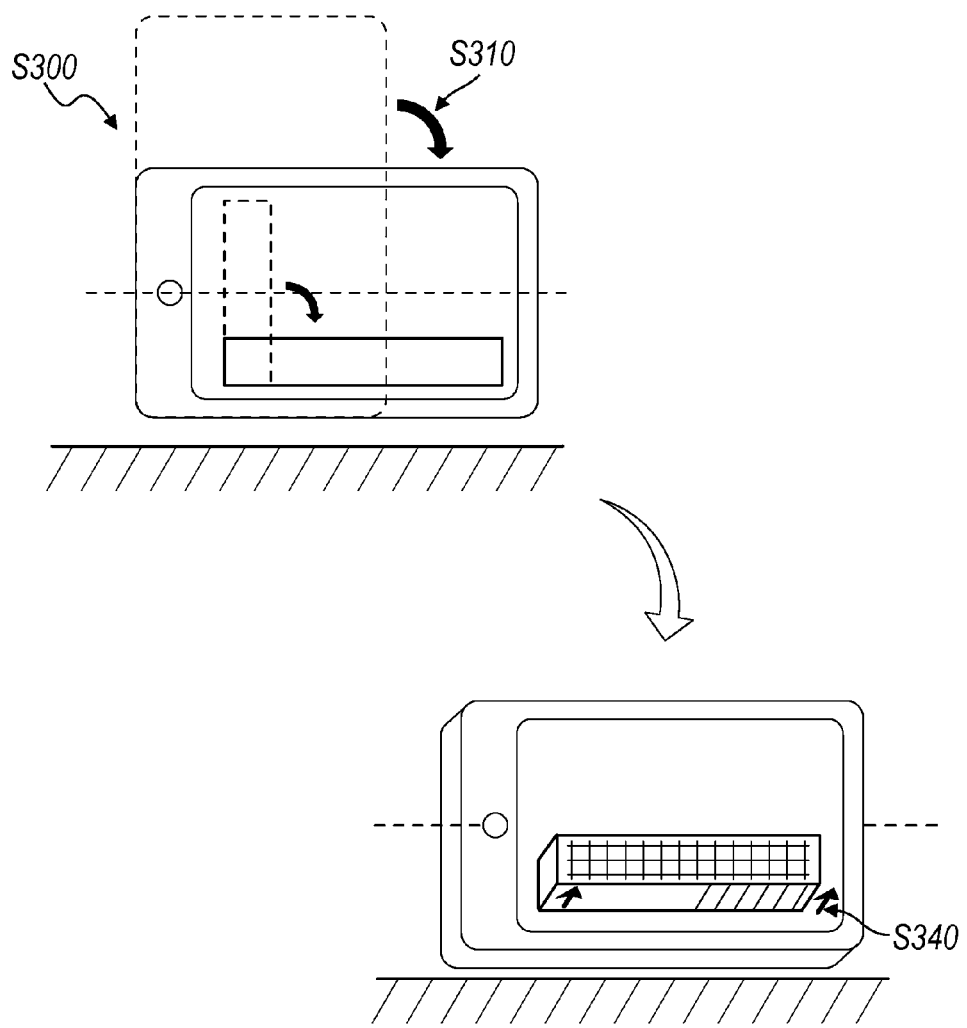
FIG. 18 is a flowchart representation of a variation of the method.

In another example, method S300 can include detecting the orientation of the mobile computing device with an accelerometer or other orientation-detecting sensor. Block S310 of method S300 can detect the minor axis of the mobile computing device substantially parallel a horizontal plane, thereby defining a portrait orientation. Block S310 of method S300 can also detect the major axis of the mobile phone substantially parallel a horizontal plane, thereby defining a landscape orientation as shown in FIG. 18. Block S320 can identify an input to a key of a virtual keyboard as an anticipated input to a native application that renders the virtual keyboard on the touchscreen of the mobile computing device. Block S320 can predict the orientation of the virtual keyboard in response to the orientation of the mobile computing device detected in Block S310. For example, Block S320 can identify an anticipated input to a portrait keyboard in response to detection of the mobile computing device in the portrait orientation. Likewise, Block S320 can identify an anticipated input to a landscape keyboard in response to detection of the mobile computing device in the landscape orientation. Block S330 can select a set of particular deformable regions corresponding to (e.g., arranged over) each key of the virtual keyboard rendered by the touchscreen. Block S340 can selectively transition the set of particular deformable regions to an expanded setting, thereby rendering a physical keyboard of deformable regions in an orientation corresponding to the orientation of the device.

Figure 13:
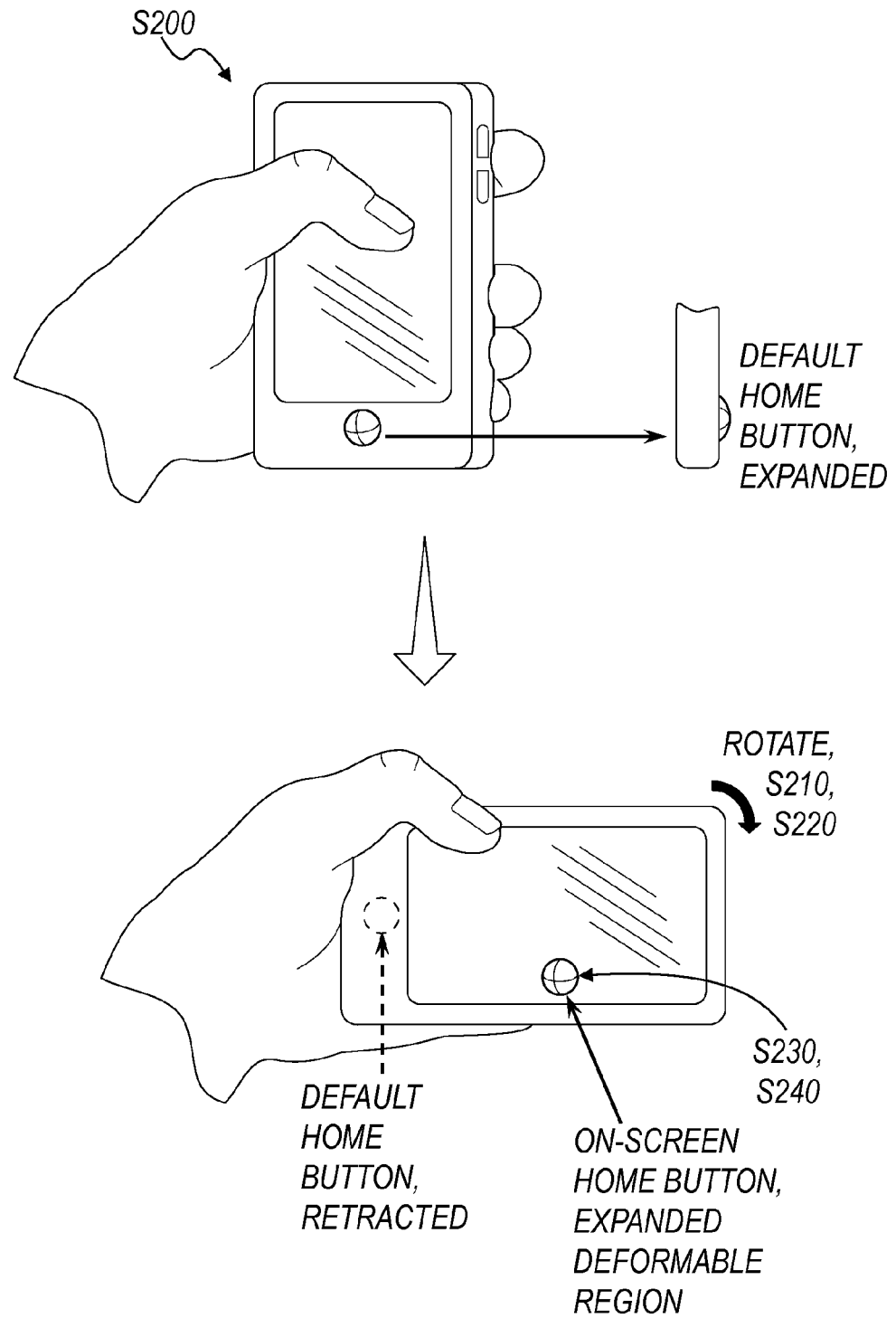
FIG. 13 is a flowchart representation of a variation of the method.

In another example shown in FIG. 13, method S300 can detect a music application executing on the mobile computing device and expand a deformable region corresponding to (e.g., adjacent, coincident) a volume control (e.g., a volume slider) in anticipation of an input to modify a volume output by the device and/or a native application executing thereon. Method S300 can detect an input object proximal a surface of the mobile computing device. For example, method S300 can detect a figure resting on a surface opposite the touchscreen (e.g., a back surface of the mobile computing device). Method S300 can identify the anticipated input that changes the volume output as a slide gesture across the tactile interface. Method S300 can select a particular deformable region or set of deformable regions that define a substantially elongated and tactilely distinguishable button on which the user can enter the slide gesture and that are located substantially coincident the input object, such as adjacent a finger resting on a back surface of the mobile computing device opposite a touchscreen.

In another example, method S300 can detect an input object proximal a surface of the device, and, upon detection of the input object contacting the device, method S300 can expand the particular deformable region coincident the input object. Method S300 can identify an anticipated input corresponding to a command to wake a "sleeping" device (e.g., a device in a low energy mode). For example, method S300 can anticipate depression of a wake button on the "sleeping" device. The "sleeping" device can be powered on (e.g., consuming energy from a battery and executing programs) but a touchscreen of the device can be disabled until the command to wake the "sleeping" device enables the touchscreen. Method S300 can detect the input object proximal or coincident a surface of the device. For example, method S300 can detect a hand or finger resting on the device as would occur if one were to hold the device in the hand. Accordingly, method S300 can select the particular deformable region coincident or adjacent the input object and selectively expand the particular deformable region. Method S300 can detect depression of the particular deformable region and interpret depression of the particular deformable region as a command to wake the "sleeping" device accordingly.

An example of this variation includes expanding a deformable region corresponding to an icon indicating receipt of an incoming message as shown in FIG. 19. In particular, method S300 includes detecting an incoming message to a native messaging application executing on the computing device. In response to the incoming message, method S300 identifies an anticipated output from the computing device and the native message application corresponding to a notification indicating receipt of the incoming message. For example, method S300 can anticipate an icon rendered by the touchscreen in response to receipt of the incoming message. The icon can include an abbreviated version of the message. Method S300 can further anticipate an input corresponding to the icon, such as a slide gesture substantially over the icon. Method S300 can unlock a lock screen and open the message in response to detection of the slide gesture into the device. Method S300 can further select a particular deformable region corresponding to the icon (e.g., of substantially the same shape as the icon) and selectively expand the deformable region to an expanded setting in anticipation of the slide input. Method S300 can also detect the slide input, which can be applied to the deformable region and, thus, the icon.

Another example of the variation includes expanding the particular deformable region corresponding in response to an incoming phone call, the particular deformable region corresponding to an anticipated input that answers the incoming phone call. In particular, method S300 can detect an incoming phone call and, thus, render a notification on the display to notify the user of the incoming phone call. For example, method S300 can render a virtual icon on a touchscreen of the device to prompt the user to answer the phone call. Additionally, method S300 can selectively expand a particular deformable region arranged over the virtual icon. Alternatively, method S300 can select and expand a particular deformable region corresponding to an anticipated input location, such as a surface of the device where an input object (e.g., the user's finger) is in contact with the device prior and up to the time of the incoming phone call. Thus, the method can raise a particular deformable region adjacent a surface of the device that the user is already touching, and the user can answer the phone call by depressing the particular deformable region thus raised under or adjacent the user's finger.

In another example, method S300 can detect an external surface, such as a surface on which the device rests, and selectively deformable the particular deformable region(s) opposite the external surface. For example, a mobile phone can rest on a surface of a table with the touchscreen of the mobile phone contacting the surface of the table. Method S300 can detect the surface of the table proximal the touchscreen. In response to receipt of an incoming phone call, method S300 can identify a notification notifying the user of the phone call, a location of the notification corresponding to a surface of the mobile phone opposite the external surface (e.g., the back of the phone), and an anticipated input corresponding to answering the incoming phone call. Thus, method S300 can select the particular deformable region corresponding to the location of the notification opposite the external surface (e.g., the back of the phone) and transition the deformable region to an expanded setting, thereby indicating the incoming phone call and providing a tactile feature on which a user can apply the anticipated input.

Figure 15:
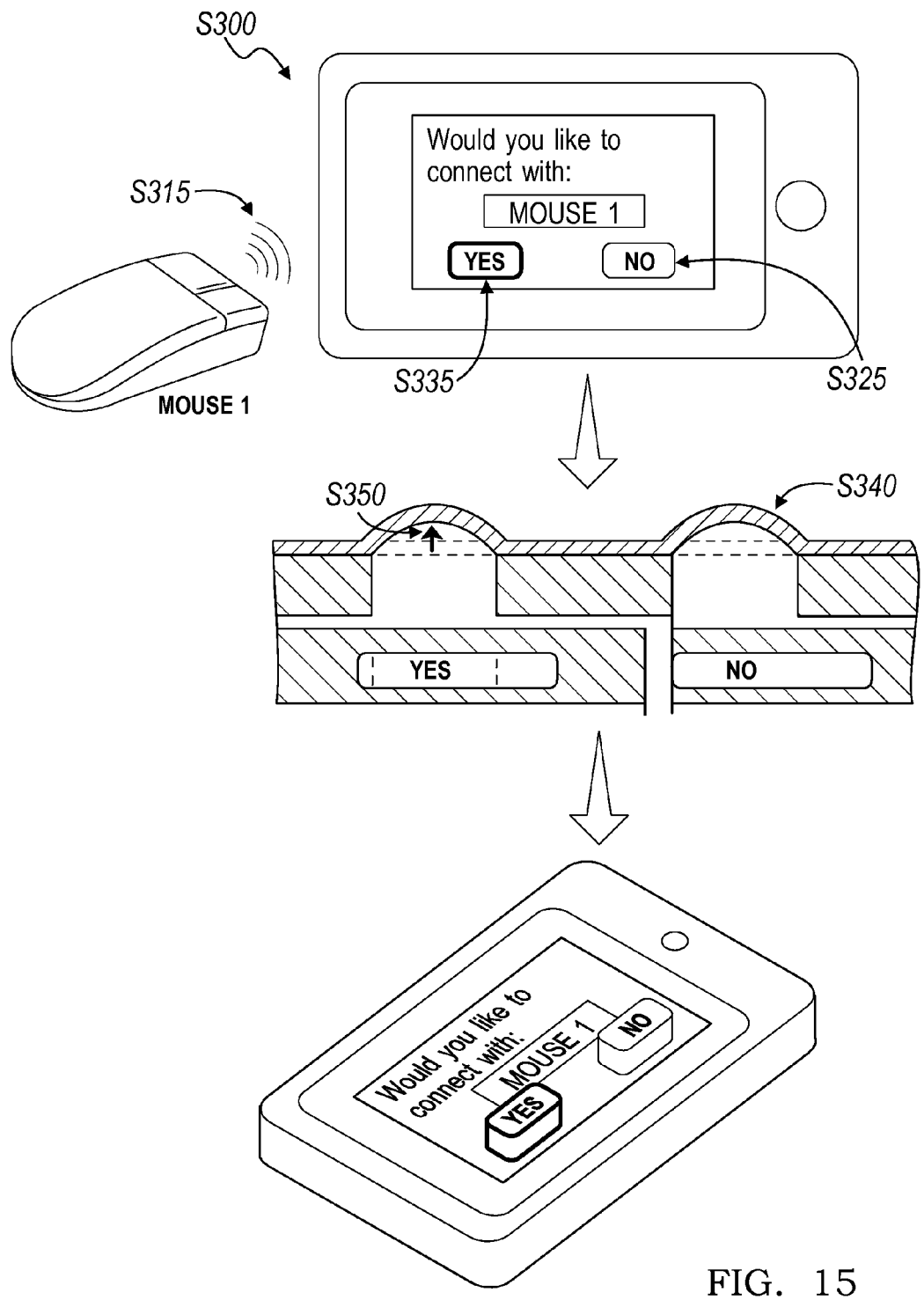
FIG. 15 is a flowchart representation of a variation of the method.

Another example of the variation includes expanding the particular deformable region corresponding to an icon representing a local area wireless technology or short-range wireless communication rendered by the touchscreen of the mobile computing device in response to short-range wireless communication (e.g., Bluetooth) between the mobile computing device and a secondary device, as shown in FIG. 15. In particular, in this example, method S300 detects a short-range wireless communication application executing on the mobile computing device. Method S300 can detect an event corresponding to the secondary device within an area proximal the mobile computing device. The secondary device can also execute a native short-range wireless communication application or emit a short-range wireless communication signal that is detectable by the mobile computing device when the secondary device is within wireless range of the mobile computing device. In response to detection of the secondary device (e.g., detection of a wireless signal from the secondary device), method S300 can render on the display of the mobile computing device an interface through which the user can confirm continued short-range wireless communication between the mobile computing device and the secondary device. Method S300 can select a deformable region substantially corresponding to the interface and selectively expand the deformable region, thereby yielding a raised button with which a user can interact to confirm continued wireless communication with the second device. The interface can correspond to an image of an icon rendered on a touchscreen within the mobile computing device, the icon graphically representing the short-range wireless communication between the devices. For example, the icon can include a list of devices (or local area networks) within the area proximal the mobile computing devices from which the user can select one or more devices (or local area networks) with which the mobile computing device may communicate. Alternatively, the interface can be represented over a region of the mobile computing device distinct from the touchscreen portion, such as a side or back surface of the mobile computing device.

In another example of the variation, method S300 can retract the deformable region(s) and disable input(s) to the mobile computing device in response to receipt of a signal from a third party device indicating the mobile computing device was lost or stolen. In particular, method S300 can detect a phone tracking application executing on the mobile computing device. Method S300 can detect a message from a third party device indicating that owner of the mobile computing device no longer possesses the mobile computing device. Thus, with the phone tracking application, method S300 tracks location and can disable interactive features of the mobile computing device. Method S300 can disable inputs and outputs to the mobile computing device. Thus, method S300 can selectively transition expanded deformable regions to the retracted setting.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, native application, frame, iframe, hardware/firmware/software elements of a user computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for registering interaction with a dynamic tactile interface comprising a tactile layer and a substrate, the tactile layer defining a tactile surface, a deformable region, and a peripheral region adjacent the deformable region and coupled to the substrate opposite the tactile surface, the method comprising:
    predicting a location of an upcoming input related to a native application executing on the device;
    selecting a particular deformable region from a set of deformable regions, the particular deformable region substantially coincident the input location;
    selectively transitioning the particular deformable region from a retracted setting into an expanded setting, the deformable region substantially flush with the peripheral region in the retracted setting and tactilely distinguishable from the peripheral region in the expanded setting; and
    detecting an input, corresponding to the upcoming input, on the particular deformable region.

2. The method of claim 1, further comprising detecting the orientation of the device.

3. The method of claim 1, wherein selectively transitioning the particular deformable region comprises displacing fluid into a variable volume adjacent the particular deformable region, the tactile layer cooperating with the substrate to define the variable volume, the fluid expanding the particular deformable region into the expanded setting.

4. The method of claim 3, wherein detecting the input on the particular deformable region comprises detecting an increase in fluid pressure within the variable volume corresponding to the particular deformable region.

5. The method of claim 1, wherein detecting the orientation of the device comprises detecting a surface of an external object proximal a second surface of the device opposite the tactile surface; and wherein selecting the particular deformable region comprises selecting the particular deformable region coincident the tactile surface in response to detection of the external object proximal the second surface of the device.

6. The method of claim 1, wherein predicting the location of the upcoming input comprises identifying the location substantially coincident an input object contacting a surface of the device prior to the upcoming input; and wherein selecting the particular deformable region comprises selecting the particular deformable region substantially coincident the location.

7. The method of claim 1, wherein detecting the orientation comprises detecting the orientation of the device based on an output of an accelerometer integrated into the device; and wherein predicting the location of the upcoming input comprises predicting the location of the upcoming input based on the orientation of the device.

8. The method of claim 6, wherein predicting the location of the upcoming input comprises identifying the location substantially coincident an input object contacting a surface of the device prior to the upcoming input; wherein predicting the location comprises identifying a native textual input application currently executing on the device and a virtual key of a portrait virtual keyboard rendered on a display incorporated into the device corresponding to the input object; wherein selecting the particular deformable region comprises selecting a subset of deformable regions of the tactile layer, each particular deformable region in the subset of particular deformable region coincident a key in a subset of keys of the portrait virtual keyboard rendered on the display and proximal the input object contacting the surface of the device.

9. The method of claim 6, wherein predicting the location of the upcoming input comprises identifying the location substantially coincident an input object contacting a surface of the device prior to the upcoming input; wherein predicting the location comprises identifying a native textual input application currently executing on the device and a virtual key of a landscape virtual keyboard rendered on a display incorporated into the device corresponding to the input object; wherein selecting the particular deformable region comprises selecting a set of particular deformable regions, each particular deformable region coincident a key of the landscape virtual keyboard and coincident the input object.

10. The method of claim 1, wherein predicting the location of the upcoming input comprises selecting an input location corresponding to a virtual shutter button rendered on a display incorporated into the device, the virtual shutter button triggering image capture within a native camera application executing on the device, and wherein selecting the particular deformable region comprises selecting the particular deformable region substantially coincident the virtual shutter button.

11. The method of claim 10, wherein selecting the input location corresponding to the virtual shutter button comprises selecting an input location corresponding to a virtual shutter button triggering image capture by a forward-facing camera integrated into the device; wherein selecting the particular deformable region substantially coincident the virtual shutter button comprises selecting the particular deformable region adjacent the virtual shutter button location at a center of a touchscreen of the device.

12. The method of claim 10 wherein predicting the location of the upcoming input comprises selecting an input location corresponding to a virtual shutter button rendered on a display incorporated into the device, the virtual shutter button triggering image capture within a native camera application executing on the device, and wherein selecting the particular deformable region comprises selecting the particular deformable region substantially coincident the input object; wherein detecting the input comprises detecting depression of the particular deformable region and triggering image capture within the native camera application.

13. The method of claim 11, wherein selecting the input location corresponding to the virtual shutter button comprises selecting an input location corresponding to a virtual shutter button triggering image capture by a rear-facing camera integrated into the device.

14. The method of claim 1, wherein predicting the location of the upcoming input comprises: identifying the input location substantially coincident an input object contacting a surface of the device prior to the upcoming input and predicting a future input for adjusting a volume output of the device; and wherein selecting the particular deformable region comprises selecting the particular deformable region coincident the input object and assigning to a volume control to the particular deformable region.

15. The method of claim 1, wherein detecting the orientation of the device comprises detecting an input object proximal a surface of the device; wherein identifying the upcoming input comprises: identifying an input associated with the input object and defining the input location substantially coincident the input object.

16. A method for registering interaction with a dynamic tactile interface comprising a tactile layer and a substrate, the tactile layer defining a tactile surface, a deformable region, and a peripheral region adjacent the deformable region and coupled to the substrate opposite the tactile surface, the method comprising:
  receiving a notification event at the device;
  predicting a particular location of an input object contacting a surface of the device prior to an upcoming input;
  in response to the notification event, rendering a virtual communication on a region of a display of the device adjacent the particular location, the virtual communication corresponding to the notification event;
  selecting a particular deformable region from a set of deformable regions, the particular deformable region adjacent the particular location;
  selectively transitioning the particular deformable region from a retracted setting into an expanded setting, the particular deformable region substantially flush with the peripheral region in the retracted setting and tactilely distinguishable from the peripheral region in the expanded setting; and
  detecting an input on the particular deformable region.

17. The method of claim 16, wherein detecting the input comprises detecting depression of the deformable region.

18. The method of claim 16, wherein receiving the notification event at the device comprises receiving a text message; wherein rendering the virtual communication comprises rendering a notification of receipt of the text message; wherein predicting the particular location of the input object comprises specifying a gesture applied by the input object to the tactile layer at the particular location; wherein selecting the particular deformable region comprises selecting the particular deformable region substantially coincident the particular location; and wherein detecting the input comprises detecting the gesture at the particular deformable region.

19. The method of claim 16, wherein selectively transitioning the particular deformable region comprises displacing fluid into a variable volume adjacent the particular region, the tactile layer cooperating with the substrate to define the variable volume, the fluid expanding the particular deformable region into the expanded setting.

20. The method of claim 16, wherein receiving the notification event at the device comprises detecting a mode of the device; wherein rendering a virtual communication comprises rendering a virtual representation of the mode of the device; wherein selecting a particular deformable region comprises selecting the particular deformable region coincident the input object; wherein detecting the input comprises detecting depression of the particular deformable from the expanded setting; and further comprising changing the mode of the device in response to detecting the input.

21. The method of claim 20, wherein detecting the mode of the device comprises detecting a current a low-energy sleeping state of the device; wherein changing the mode of the device comprises waking the device from the low-energy sleeping state.

22. The method of claim 16, wherein receiving the notification event comprises detecting a second device proximal the device communicating with the device over wireless communication protocol; wherein rendering the virtual communication comprises rendering a notification comprising a request to confirm wireless communication with the second device; wherein detecting the particular location comprises identifying the particular location substantially coincident an input object contacting a surface of the device; wherein selecting the particular deformable region comprises selecting the deformable region, from a set of deformable regions, coincident the particular location; and wherein detecting the input comprises detecting depression of the deformable region from the expanded setting and confirming wireless communication between the device and the second device in response to the input.

23. The method of claim 16, wherein detecting the input comprises detecting an increase in pressure within the variable volume.

* * * * *